(12) United States Patent
Louison et al.

(10) Patent No.: US 11,975,283 B2
(45) Date of Patent: *May 7, 2024

(54) RADIAL SEAL AIR FILTER

(71) Applicant: CUMMINS FILTRATION IP, INC., Columbus, IN (US)

(72) Inventors: Matthew Louison, McFarland, WI (US); Scott W. Schwartz, Cottage Grove, WI (US); Mark V. Holzmann, Stoughton, WI (US); Jessie A. Knight, Oregon, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/836,215

(22) Filed: Jun. 9, 2022

(65) Prior Publication Data
US 2022/0297049 A1 Sep. 22, 2022

Related U.S. Application Data

(63) Continuation of application No. 16/631,974, filed as application No. PCT/US2018/042589 on Jul. 18, 2018, now Pat. No. 11,426,692.
(Continued)

(51) Int. Cl.
*B01D 46/24* (2006.01)
*B01D 46/00* (2022.01)

(52) U.S. Cl.
CPC ..... *B01D 46/2414* (2013.01); *B01D 46/0005* (2013.01); *B01D 2265/021* (2013.01);
(Continued)

(58) Field of Classification Search
CPC ........ B01D 2271/027; B01D 2265/021; B01D 2265/026; B01D 46/2414; B01D 46/0005;
(Continued)

(56) References Cited

U.S. PATENT DOCUMENTS 3,745,753 A 7/1973 Risse
3,928,007 A 12/1975 Jackson
(Continued)

FOREIGN PATENT DOCUMENTS

CN 2855503 Y 1/2007
CN 101048215 A 10/2007
(Continued)

OTHER PUBLICATIONS

First Office Action issued for Chinese Patent Application No. 202080075668.6 dated Jun. 5, 2023, 11 pages.
(Continued)

*Primary Examiner* — Robert Clemente
(74) *Attorney, Agent, or Firm* — Foley & Lardner LLP

(57) ABSTRACT

Various example embodiments relate to a filtration system. The filtration system comprises a housing having a first housing end and a second housing end. The housing defines a central compartment therein. The housing comprises a first alignment portion disposed on the first housing end. The filtration system further comprises a filter element positioned within the central compartment of the housing. The filter element has a first filter end and a second filter end. The filter element comprises filter media and a second alignment portion disposed on the first filter end. The second alignment portion is complementary to the first alignment portion. The installation of the filter element within the housing causes the first alignment surface and the second alignment surface to align to provide for engagement of a radial seal between the filter element and the housing.

14 Claims, 16 Drawing Sheets

Related U.S. Application Data

(60) Provisional application No. 62/535,068, filed on Jul. 20, 2017.

(52) U.S. Cl.
CPC .. *B01D 2265/026* (2013.01); *B01D 2271/027* (2013.01); *B01D 2275/206* (2013.01); *B01D 2279/60* (2013.01)

(58) Field of Classification Search
CPC .... B01D 35/28; B01D 35/30; B01D 46/0046; B01D 2201/347; B01D 2279/60
See application file for complete search history.

(56) References Cited

U.S. PATENT DOCUMENTS

| | | |
|---|---|---|
| 4,162,905 A | 7/1979 | Schuler |
| 5,244,755 A | 9/1993 | Benoist et al. |
| 5,258,127 A | 11/1993 | Gsell et al. |
| 5,295,602 A | 3/1994 | Swanson |
| 5,315,483 A | 5/1994 | Tracy |
| 5,545,241 A | 8/1996 | Vanderauwera et al. |
| 5,547,480 A | 8/1996 | Coulonvaux |
| 5,556,440 A | 9/1996 | Mullins et al. |
| 5,730,769 A | 3/1998 | Dungs et al. |
| 5,891,337 A | 4/1999 | Keller et al. |
| 5,893,937 A | 4/1999 | Moessinger |
| 5,919,279 A | 7/1999 | Merritt et al. |
| 6,039,778 A | 3/2000 | Coulonvaux |
| 6,051,042 A | 4/2000 | Coulonvaux |
| 6,152,979 A | 11/2000 | Cappuyns |
| 6,334,887 B1 | 1/2002 | Coulonvaux |
| 6,402,798 B1 | 6/2002 | Kallsen et al. |
| 6,419,718 B1 | 7/2002 | Klug et al. |
| 6,436,162 B1 | 8/2002 | Wake et al. |
| 6,599,342 B2 | 7/2003 | Andress et al. |
| 6,623,049 B2 | 9/2003 | Shreeve et al. |
| 6,723,148 B2 | 4/2004 | Stass |
| 6,902,598 B2 | 6/2005 | Gunderson et al. |
| 6,958,083 B1 | 10/2005 | Schmitz et al. |
| 7,063,730 B2 | 6/2006 | Connor et al. |
| 7,070,642 B2 | 7/2006 | Scott et al. |
| 7,097,694 B1 | 8/2006 | Jaroszczyk et al. |
| 7,125,490 B2 | 10/2006 | Clendenning et al. |
| 7,247,183 B2 | 7/2007 | Connor et al. |
| 7,276,098 B2 | 10/2007 | Koslow |
| 7,282,077 B2 | 10/2007 | Honisch et al. |
| 7,291,198 B2 | 11/2007 | Gieseke et al. |
| 7,314,558 B1 | 1/2008 | Jaroszczyk et al. |
| 7,323,105 B1 | 1/2008 | Janikowski et al. |
| 7,323,106 B2 | 1/2008 | Jaroszczyk et al. |
| 7,413,588 B2 | 8/2008 | Holzmann et al. |
| 7,537,631 B2 | 5/2009 | Scott et al. |
| 7,540,895 B2 | 6/2009 | Furseth et al. |
| 7,563,300 B2 | 7/2009 | Nishiyama et al. |
| D600,790 S | 9/2009 | Nelson et al. |
| 7,625,419 B2 | 12/2009 | Nelson et al. |
| 7,645,546 B2 | 1/2010 | Yang et al. |
| 7,658,777 B2 | 2/2010 | Kopec et al. |
| 7,662,203 B2 | 2/2010 | Scott et al. |
| 7,662,216 B1 | 2/2010 | Terres et al. |
| 7,740,678 B2 | 6/2010 | Gunderson et al. |
| 7,753,982 B2 | 7/2010 | Merritt et al. |
| RE41,713 E | 9/2010 | Gunderson et al. |
| 7,789,926 B2 | 9/2010 | Rieger et al. |
| 7,799,108 B2 | 9/2010 | Connor et al. |
| 7,828,870 B1 | 11/2010 | Rech et al. |
| 7,879,125 B2 | 2/2011 | Haberkamp et al. |
| RE42,174 E | 3/2011 | Gunderson et al. |
| 7,931,725 B2 | 4/2011 | Wydeven et al. |
| 7,959,703 B2 | 6/2011 | Merritt et al. |
| 7,976,601 B2 | 7/2011 | Xu et al. |
| 7,976,602 B2 | 7/2011 | Munkel |
| 7,981,183 B2 | 7/2011 | Nepsund et al. |
| 7,981,186 B2 | 7/2011 | Schrage et al. |
| 7,988,757 B2 | 8/2011 | Scott et al. |
| 7,993,422 B2 | 8/2011 | Krisko et al. |
| 8,038,756 B2 | 10/2011 | Iddings et al. |
| 8,097,061 B2 | 1/2012 | Smith et al. |
| 8,163,057 B2 | 4/2012 | Blossey et al. |
| 8,177,874 B2 | 5/2012 | Bittle et al. |
| 8,177,971 B2 | 5/2012 | Bittle et al. |
| 8,216,335 B2 | 7/2012 | Scott et al. |
| 8,286,804 B2 | 10/2012 | Weindorf |
| 8,394,166 B2 | 3/2013 | Scott |
| 8,460,425 B2 | 6/2013 | Scott et al. |
| 8,545,588 B2 | 10/2013 | Iddings et al. |
| 8,828,114 B2 | 9/2014 | Dhiman et al. |
| 8,828,123 B2 | 9/2014 | Holzmann et al. |
| 9,089,804 B2 | 7/2015 | Campbell et al. |
| 9,457,308 B2 | 10/2016 | Kaufmann et al. |
| 9,463,404 B2 | 10/2016 | Rieger et al. |
| 9,498,743 B2 | 11/2016 | Dhiman et al. |
| 9,511,317 B2 | 12/2016 | Ruhland et al. |
| 9,636,608 B2 | 5/2017 | Morris et al. |
| 11,136,947 B2 | 10/2021 | Von Seggern et al. |
| 11,311,829 B2 | 4/2022 | Nelson et al. |
| 11,426,692 B2 * | 8/2022 | Louison ............ B01D 35/30 |
| 11,633,683 B2 | 4/2023 | Louison et al. |
| 2002/0046556 A1 | 4/2002 | Reid |
| 2003/0184025 A1 | 10/2003 | Matsuki |
| 2004/0035097 A1 | 2/2004 | Schlensker et al. |
| 2004/0134171 A1 | 7/2004 | Scott et al. |
| 2005/0193695 A1 | 9/2005 | Holmes et al. |
| 2006/0086075 A1 | 4/2006 | Scott et al. |
| 2008/0190082 A1 | 8/2008 | Scott et al. |
| 2008/0276583 A1 | 11/2008 | Munkel |
| 2009/0057219 A1 | 3/2009 | Bagci et al. |
| 2009/0071111 A1 | 3/2009 | Lundgren et al. |
| 2009/0094951 A1 | 4/2009 | Baseotto et al. |
| 2009/0126324 A1 | 5/2009 | Smith et al. |
| 2009/0241489 A1 | 10/2009 | Becker et al. |
| 2010/0064646 A1 | 3/2010 | Smith et al. |
| 2010/0146920 A1 | 6/2010 | Iddings et al. |
| 2010/0258493 A1 | 10/2010 | Kindkeppel et al. |
| 2012/0060453 A1 | 3/2012 | Holzmann et al. |
| 2012/0067014 A1 | 3/2012 | Dhiman et al. |
| 2012/0181224 A1 | 7/2012 | Rapin |
| 2013/0086877 A1 | 4/2013 | Kori et al. |
| 2013/0263744 A1 | 10/2013 | Osendorf et al. |
| 2014/0251895 A1 | 9/2014 | Wagner |
| 2014/0260994 A1 | 9/2014 | Grider et al. |
| 2015/0101298 A1 | 4/2015 | Osendorf et al. |
| 2015/0292448 A1 | 10/2015 | Campbell et al. |
| 2016/0136562 A1 | 5/2016 | Nepsund et al. |
| 2016/0332103 A1 | 11/2016 | Marks et al. |
| 2017/0021291 A1 | 1/2017 | Morris et al. |

FOREIGN PATENT DOCUMENTS

| | | |
|---|---|---|
| CN | 201357024 A | 12/2009 |
| CN | 101952010 | 1/2011 |
| CN | 102350151 A | 2/2012 |
| CN | 102527163 A | 7/2012 |
| CN | 103025405 A | 4/2013 |
| CN | 103442782 | 12/2013 |
| CN | 103442782 A | 12/2013 |
| CN | 103635244 A | 3/2014 |
| CN | 103732303 A | 4/2014 |
| CN | 104028060 B | 9/2014 |
| CN | 104415619 | 3/2015 |
| CN | 104421062 | 3/2015 |
| CN | 104421063 A | 3/2015 |
| CN | 204419408 U | 6/2015 |
| CN | 204611988 U | 9/2015 |
| CN | 105263600 A | 1/2016 |
| CN | 105324572 A | 2/2016 |
| CN | 205173132 U | 4/2016 |
| CN | 105658944 A | 6/2016 |
| CN | 105840363 A | 8/2016 |
| CN | 106413841 | 2/2017 |
| CN | 206381744 U | 8/2017 |
| CN | 111757776 B | 10/2020 |

(56) References Cited

FOREIGN PATENT DOCUMENTS

| | | |
|---|---|---|
| DE | 10 2014 012 948 A1 | 6/2015 |
| EP | 0 723 800 A1 | 7/1996 |
| EP | 1 769 835 A2 | 4/2007 |
| EP | 2 227 306 A1 | 9/2010 |
| EP | 2 742 986 | 6/2014 |
| TW | 428670 U | 4/2007 |
| WO | WO-02/31340 A1 | 4/2002 |
| WO | WO-2004/039476 A1 | 5/2004 |
| WO | WO-2006/026241 A1 | 3/2006 |
| WO | WO-2008/124437 | 10/2008 |
| WO | WO-2009/019443 A1 | 2/2009 |
| WO | WO-2016/040016 A1 | 3/2016 |
| WO | WO-2019/018465 A1 | 1/2019 |
| WO | WO-2019/140045 A1 | 7/2019 |

OTHER PUBLICATIONS

First Office Action issued for Chinese Patent Application No. 202210037902.7, dated Dec. 9, 2023, 5 pages.

Office Action issued for Indian Patent Application No. dated Dec. 19, 2022, 6 pages.

First Examination Report for Indian Patent Application No. 2835/KOLNP/2012 dated Jul. 17, 2018, 9 pages.

Fist Office Action for Chinese Patent App. No. 201180030354.5 dated Apr. 18, 2014, 36 pages (with translation).

First Office Action issued for Chinese Patent Application No. CN 201980012052.1, dated Jun. 25, 2021, 14 pages.

First Office Action issued for Indian Patent No. 202247054456 dated Nov. 17, 2022, 6 pages.

Office Action issued for Indian Patent Application No. 201838035652 dated Feb. 17, 2021, 6 pages.

Office Action issued for Indian Patent Application No. 202047033457 dated Mar. 15, 2021, 5 pages.

Office Action issued for Indian Patent Application No. 202247023311 dated Jun. 22, 2022, 6 pages.

International Search Report and Written Opinion issued for PCT PCT/US2021/026608, dated Jun. 24, 2021.

International Search Report & Written Opinion for PCT/US11/51880 dated Feb. 2, 2012, 7 pages.

International Search Report and Written Opinion for PCT Application No. PCT/US2020/059838, dated Mar. 18, 2021.

International Search Report and Written Opinion issued for PCT Application No. PCT/US2021/026608 dated Sep. 1, 2021.

International Search Report and Written Opinion issued for PCT/US2019/012985, dated Mar. 27, 2019, 10 pages.

Non-Final Office Action on U.S. Appl. No. 16/961,176 dated Mar. 17, 2022.

Office Action for Brazilian Patent App. No. 1120120252518 dated Feb. 12, 2019, 8 pages (with translation).

Office Action for U.S. Appl. No. 13/234,309 dated Jan. 27, 2014, 11 pages.

Office Action for U.S. Appl. No. 14/453,084 dated Jan. 14, 2016, 7 pages.

Final Office Action for U.S. Appl. No. 16/631,974, dated Feb. 2, 2022.

Foreign Action for CN Application No. 2018800481949, dated Apr. 28, 2021.

Foreign Action for PCT Application No. PCT/US2018/042589, dated Jan. 30, 2020.

International Search Report and Written Opinion issued for PCT/US2018/042589, dated Sep. 25, 2018, 14 pages.

Notice of Allowance for U.S. Appl. No. 16/631,974, dated Apr. 18, 2022.

US Office Action for U.S. Appl. No. 16/631,974, dated Aug. 19, 2021.

Non-Final Office Action on U.S. Appl. No. 18/132,056 dated Nov. 6, 2023.

\* cited by examiner

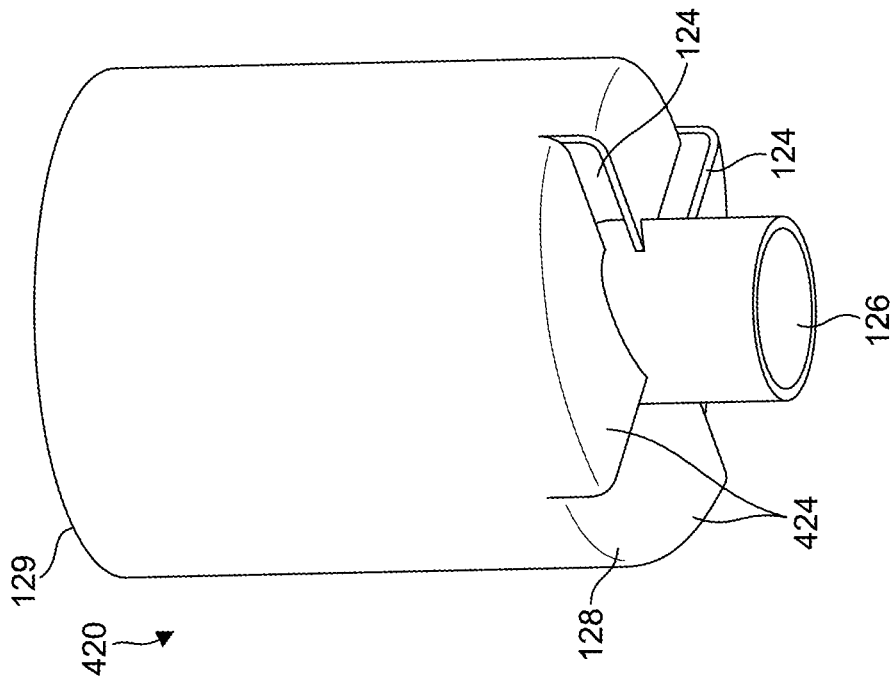
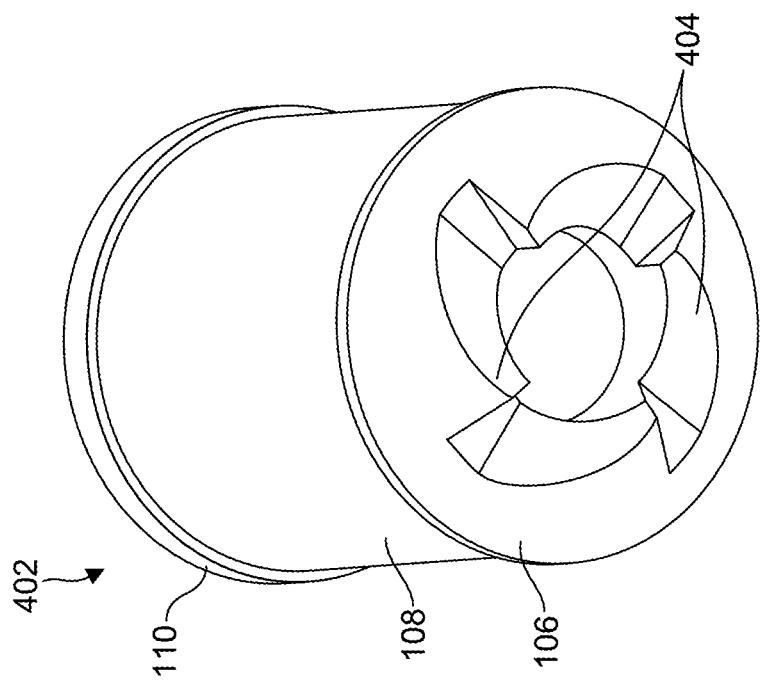
FIG. 4B
FIG. 4A

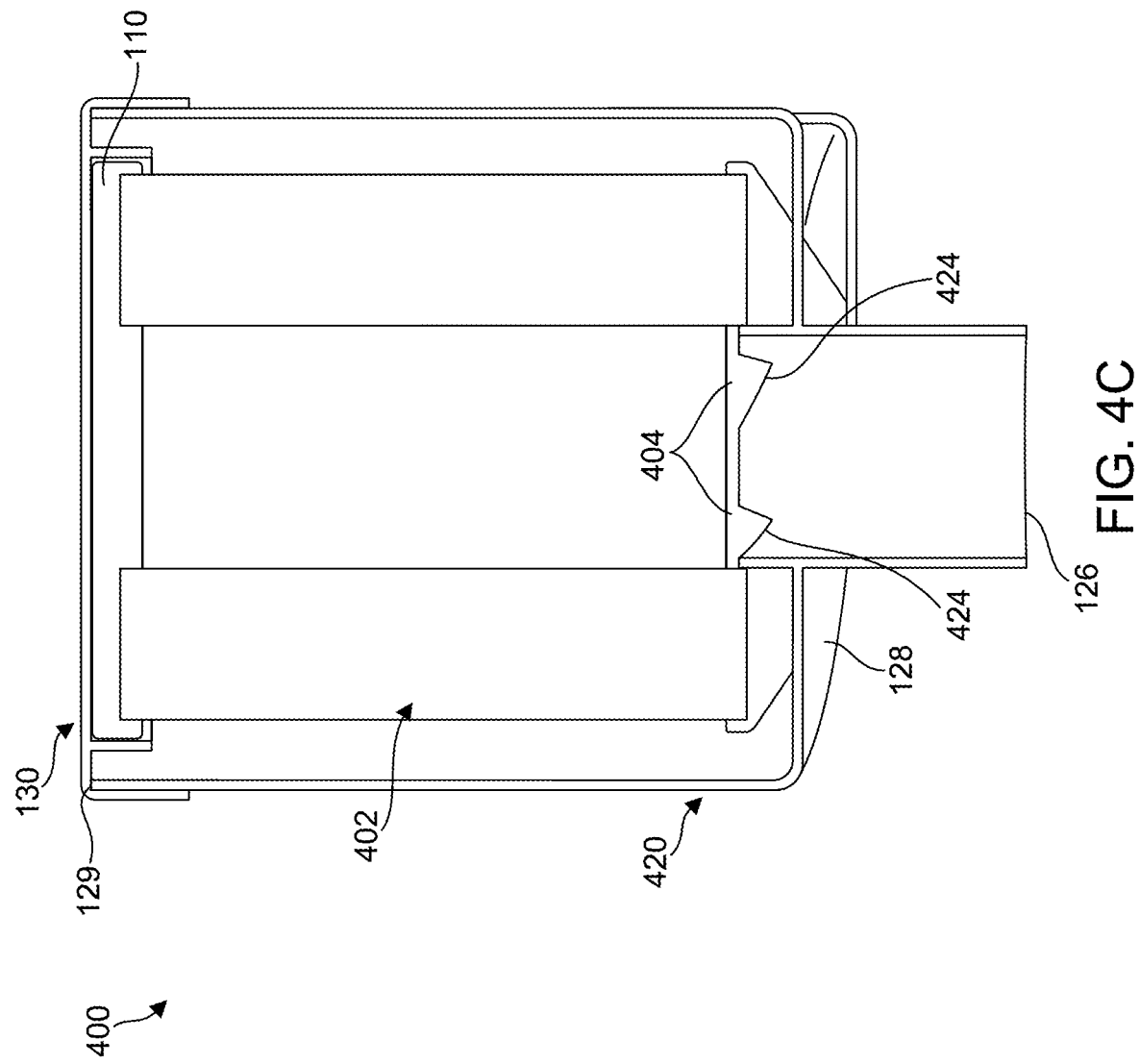

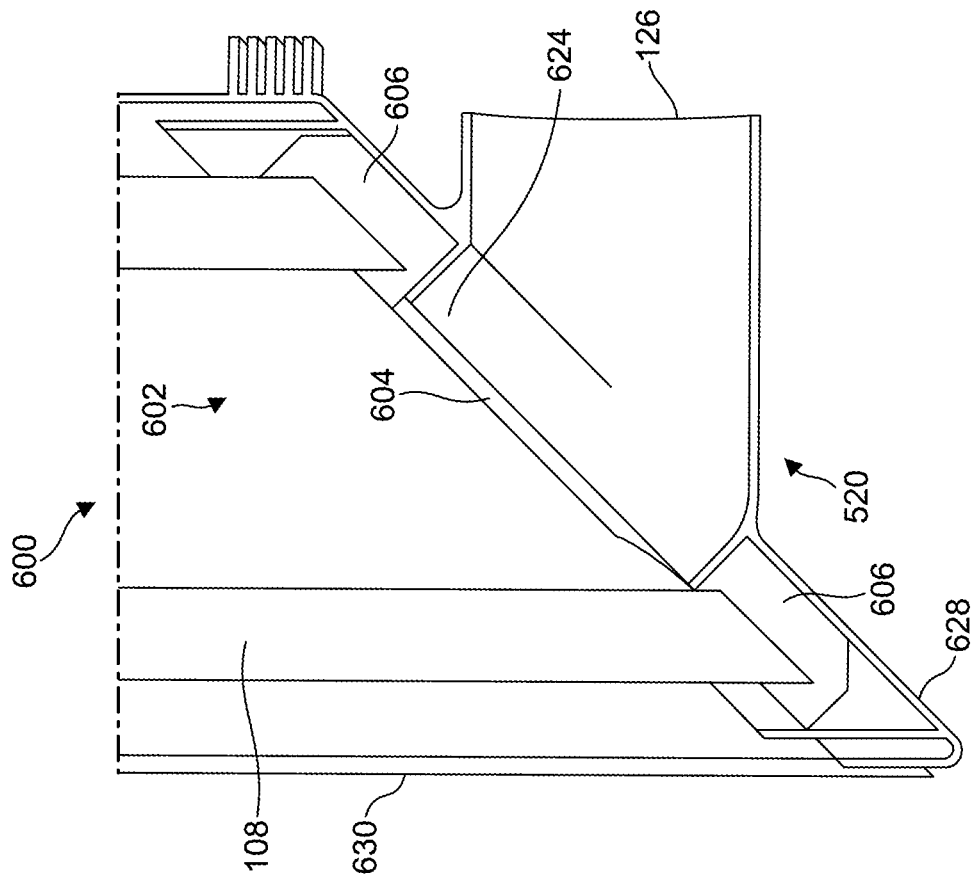
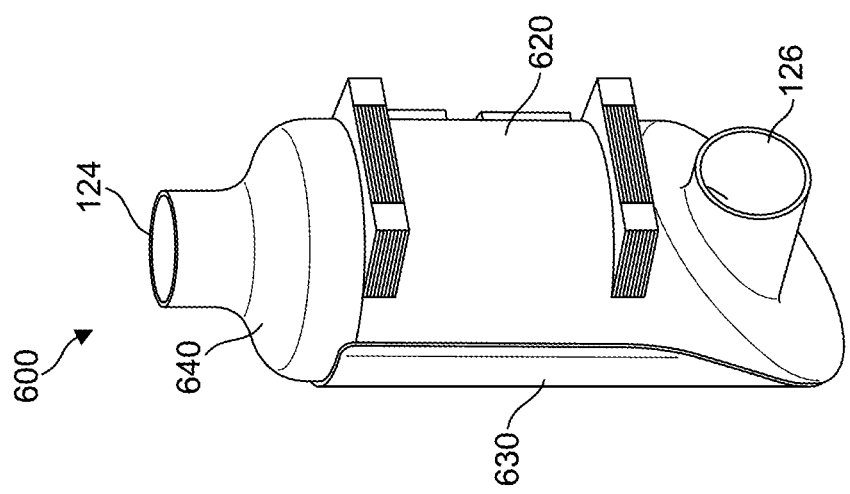
FIG. 6D
FIG. 6C

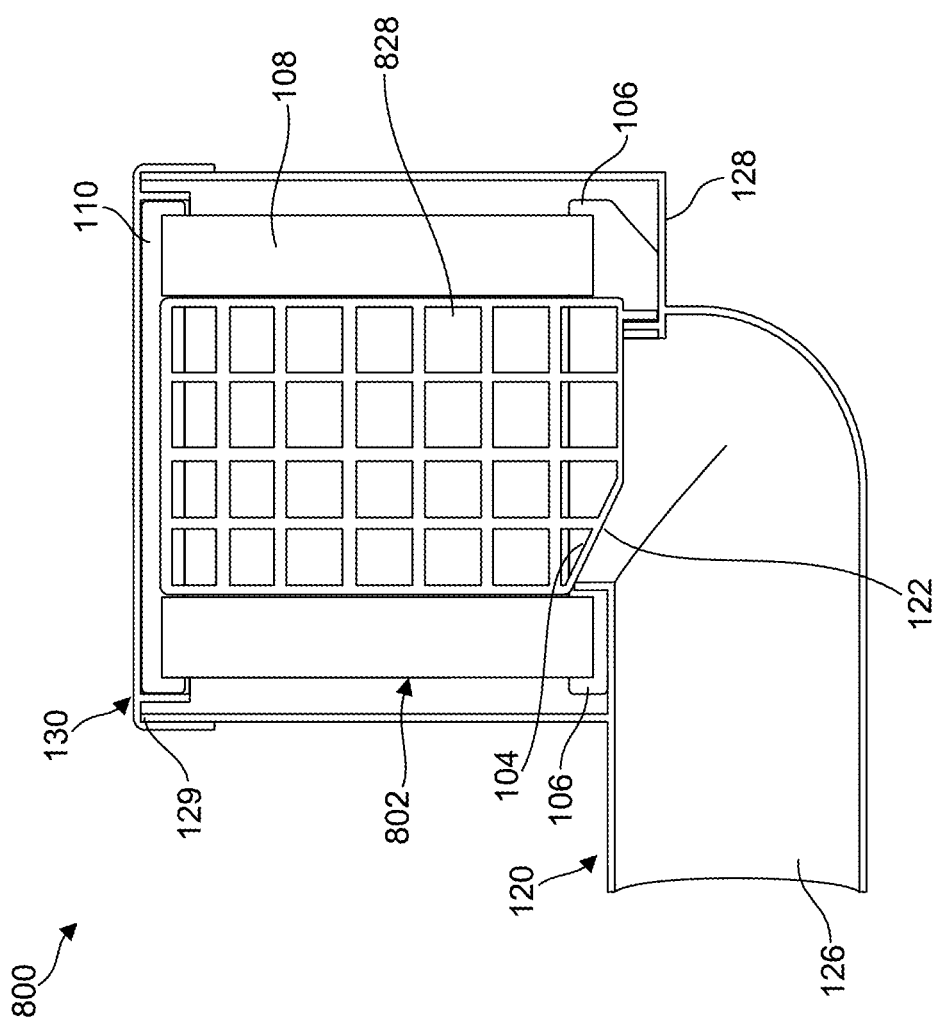

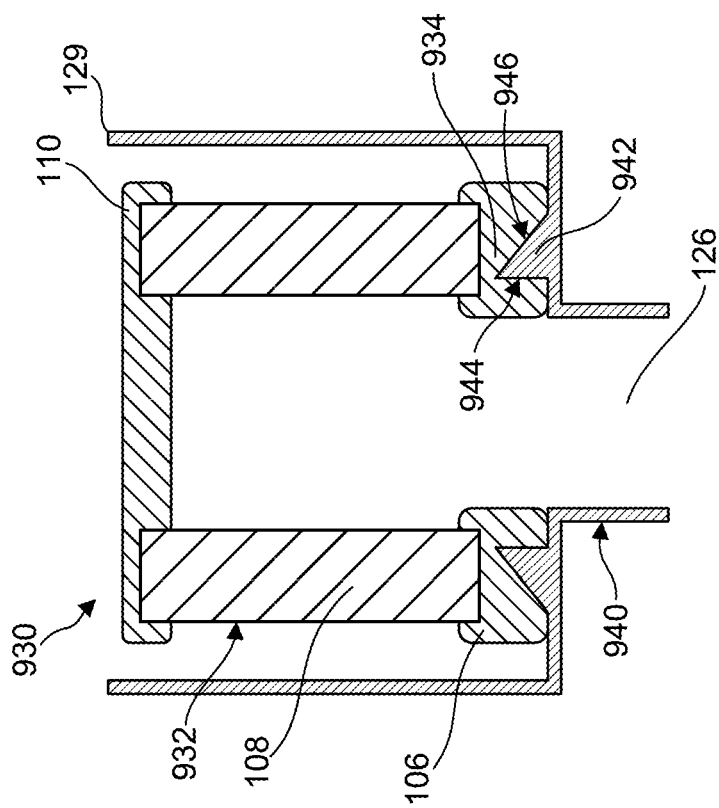

RADIAL SEAL AIR FILTER

CROSS-REFERENCE TO RELATED PATENT APPLICATION

The present application is a continuation of U.S. patent application Ser. No. 16/631,974, filed Jan. 17, 2020, which is the national stage of PCT Application No. PCT/US2018/042589, filed Jul. 18, 2018, which claims the benefit of and priority to U.S. Provisional Patent Application No. 62/535,068, filed Jul. 20, 2017. The contents of these applications are incorporated herein by reference in their entirety and for all purposes.

TECHNICAL FIELD

The present application relates to filter elements for filtering fluids in internal combustion engine systems or the like.

BACKGROUND

Internal combustion engines generally combust a mixture of fuel (e.g., gasoline, diesel, natural gas, etc.) and air. Prior to entering the engine, the intake air is typically passed through a filtration system to remove contaminants (e.g., dust, water, oil, etc.) from the intake air. The filtration system includes a filter element having filter media. As the air passes through the filter media of the filter element, the filter media removes at least a portion of the contaminants in the air thereby preventing unwanted contaminants from entering the internal combustion engine. In some cases, unauthorized or non-genuine replacement filter elements may be installed in the filtration systems during servicing operations. The unauthorized and non-genuine replacement filter elements may be of inferior quality to genuine, authorized filter elements. Thus, the use of unauthorized or non-genuine replacement filter elements may cause damage to the engine by allowing contaminants past the filter element.

Filter elements often include a seal member that is compressed against a component of the filtration system housing or another portion of the filtration system. The seal member forms a seal between the filtration system housing and the filter element, thereby preventing fluid from bypassing the filter element (e.g., for air to bypass an air filter element). If an improper filter element (i.e., a non-authorized or non-genuine filter element) is installed in a filtration system, the seal member of the filter element may not form a proper seal, and fluid may bypass the filter element causing damage to downstream components.

SUMMARY

Various example embodiments relate to a filtration system. The filtration system comprises a housing having a first housing end and a second housing end. The housing defines a central compartment therein. The housing comprises a first alignment portion disposed on the first housing end. The filtration system further comprises a filter element positioned within the central compartment of the housing. The filter element has a first filter end and a second filter end. The filter element comprises filter media and a second alignment portion disposed on the first filter end. The second alignment portion is complementary to the first alignment portion. The installation of the filter element within the housing causes the first alignment surface and the second alignment surface to align to provide for engagement of a radial seal between the filter element and the housing.

Another example embodiment relates to a filter element. The filter element is configured to be positioned within a central compartment of a housing. The filter element has a first filter end and a second filter end. The filter element comprises filter media and a first alignment portion disposed on the first filter end. The first alignment portion is complementary to a second alignment portion on the housing. The installation of the filter element within the housing causes the first alignment surface and the second alignment surface to align so as to provide for engagement of a radial seal between the filter element and the housing.

Another example embodiment relates to a filtration system. The filtration system comprises a housing having a first housing end and a second housing end. The housing defines a central compartment therein. The housing comprises a first alignment portion disposed on the first housing end. The first alignment portion comprises a first surface with a first height that varies in a z-direction. The z-direction is perpendicular to an x-y plane. The x-y plane is normal to a central axis of the housing. A filter element is positioned within the central compartment of the housing. The filter element has a first filter end and a second filter end. The filter element comprises a filter media and a second alignment portion disposed on the first filter end. The second alignment portion comprises a second surface with a second height that varies in the z-direction. The installation of the filter element within the housing causes the second surface and the first surface of the first alignment portion to align so as to provide for engagement of a radial seal between the filter element and the housing.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 4A shows a perspective view of a filter element according to another example embodiment.

FIG. 4B shows a perspective view of a housing complementary to the filter element of FIG. 4A.

FIG. 4C shows a cross-sectional, side view of a filtration system including the filter element of FIG. 4A and the housing of FIG. 4B.

FIG. 6C shows a perspective view of a filtration system including the filter element of FIG. 6A and the housing of 6B.

FIG. 6D shows a cross-sectional, perspective view of a portion of the filtration system of FIG. 6C.

FIG. 8A shows a perspective view of a filtration system including a keyed center tube interface according to a further example embodiment.

FIG. 9C shows a cross-sectional, side view of a filtration system including a central sealing rib according to another example embodiment.

DETAILED DESCRIPTION

Referring to the figures generally, a filtration system having both substantially lateral planar (e.g., perpendicular with an axial central axis of the filter element) portion(s) and alignment portion(s) disposed on a filter element and a housing is described. As used herein, the term "alignment portion" or "alignment surface" refers to a surface that is angled relative to the central axis, arched, contoured, comprised of multiple intersecting laterally planar sub-portions, non-lateral planar sub-portions, and/or non-normal to the central axis sub-portions, etc. In other words, the alignment portion(s) include a surface or surfaces with varying height in a z-direction with respect to an x-y plane, with the x-y plane being normal to the central axis of the housing and/or filter element. Generally, the installation of the filter element within the housing causes the alignment surfaces to align, which provides sufficient travel for engagement of a radial seal between the filter element and the housing wall. Variations of a filter element having one or more alignment portions and a housing having a complementary alignment portion(s) are described. Accordingly, the radial seal between the filter element and center of the housing will vary in the z-direction (where the x-y plane is normal to the central axis of the filter element and/or housing). The alignment surfaces of the housing and the filter element prevent proper filtration system function and sealing when an unauthorized replacement filter element having a flat axial seal member is installed in the housing. As will be appreciated, the variation of the filtration system may include either end of the filter element or housing (e.g., filter housing) being open or closed; either end of the filter element or housing being an alignment portion; and either end of the filter element or housing being non-parallel to each other.

Figure 1B:
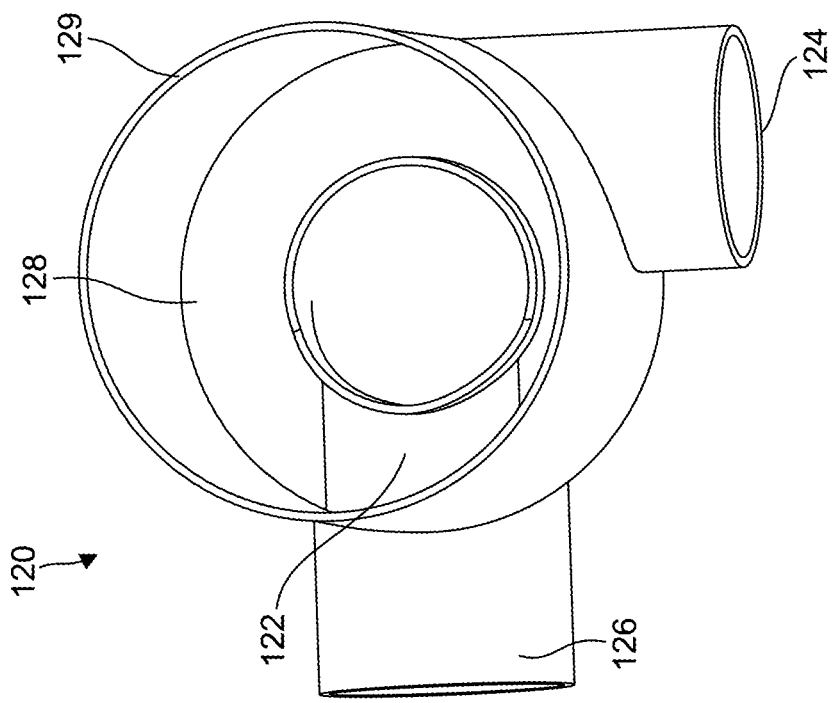
FIG. 1B shows a perspective view of a housing complementary to the filter element of FIG. 1A.
Figure 1A:
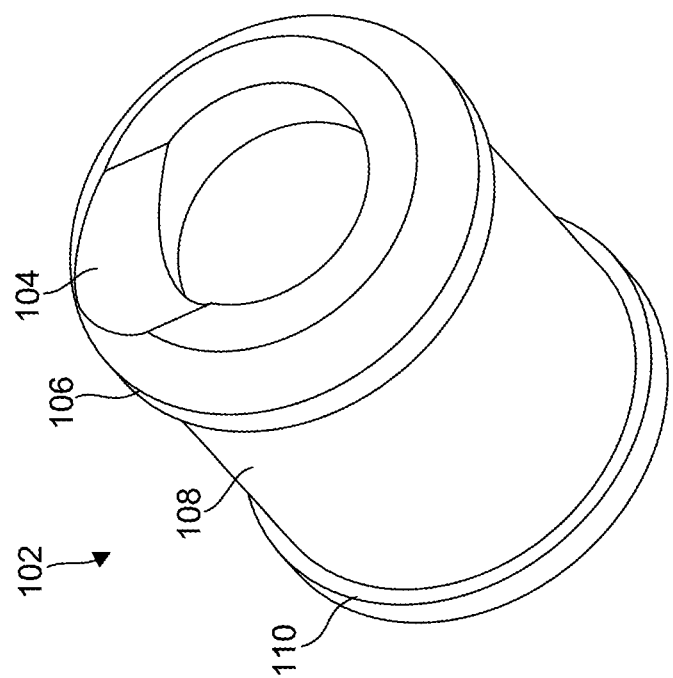
FIG. 1A shows a perspective view of a filter element according to an example embodiment.

Referring to FIG. 1A, a perspective view of a filter element 102 is shown, according to an example embodiment. The filter element 102 includes filter media 108 disposed between a first end cap 106 and a second end cap 110. As shown in FIG. 1A, the first end cap 106 is disposed on a bottom end of the filter element 102, and the second end cap 110 is disposed on a top end of the filter element 102. Alternatively, in some embodiments, the first end cap 106 is disposed on the top end of the filter element 102 and the second end cap 110 is disposed on the bottom end of the filter element 102. As shown in FIG. 1A, the first end cap 106 includes a substantially lateral planar surface that is substantially normal to the central axis of the filter element 102 and an alignment portion (e.g., alignment surface, protrusion, etc.) 104, in the form of a contoured surface, which is extruded in a direction perpendicular to the central axis such that a portion of the surface is in a direction normal to the central axis and a portion of the surface (e.g., direction of indentation) is in a direction parallel to the central axis of the filter element 102. As shown in FIG. 1A, the alignment portion 104 is a depressed surface. In some embodiments, the alignment portion 104 may be in the form of a protruding surface. As will be appreciated, when the first end cap 106 and alignment portion 104 align with a housing having a complementary alignment portion, it provides sufficient travel for engagement of a radial seal between the filter element 102 and center of the housing wall. In some arrangements, the radial seal is formed around the location of the engagement of the center of the vertical axis of the filter housing wall and the filter element 102.

Although the filter media 108 is shown arranged as a cylindrical filter block having a circular cross-sectional shape, the filter media 108 can be arranged in other shapes (e.g., racetrack or oval shapes). The filter media 108 may comprise, for example, pleated filter media 108 arranged in a panel or pleat block, corrugated filter media (often referred to as pleated filter media 108) that is arranged in a panel, a block, a cylinder, or the like, other arrangements.

In one set of embodiments, the filter media 108 is generally formed by a flat sheet of filter media 108 and a formed sheet of filter media 108. The formed sheet includes a plurality of crests formed by a curves and/or pleats in the sheet. The plurality of crests form tetrahedron channels between the formed sheet and the flat sheet. Embossments, such as dimples, are provided on the crests formed by the curves and/or pleats. The embossments help to maintain spacing between adjacent layers of the filter media (i.e., between the formed sheet and the flat sheet), thereby increasing dust holding capacity and lowering pressure drop over similarly configured filter media not having the embossments. In some arrangements, the filter media 108 is pleated along a plurality of bend lines. The bend lines extend axially along an axial direction and include a first set of bend lines extending from the upstream inlet axially towards the downstream outlet, and a second set of bend lines extending from the downstream outlet axially towards the upstream inlet.

In some arrangements, the filter media 108 includes a plurality of inlet tetrahedron flow channels and a plurality of outlet tetrahedron flow channels. The inlet tetrahedron merge in a central portion of the filter material, thereby allowing axial cross-flow of air between the inlet tetrahedron channels prior to the air passing through the filter media. Such an arrangement provides for additional dust loading on the upstream side of the media, which increases filter capacity. Specific arrangements of such tetrahedral filter media are further described in U.S. Pat. No. 8,397,920. In an alternate arrangement, the flow channels comprise flutes that are alternately sealed at the upstream and downstream ends.

The filter element 102 is substantially rigid such that the shape of the filter element 102 is substantially maintained during installation and use. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying with a stiffening agent, such as BASF® Elastocast 55090, polyurethane, or the like, etc.).

Referring to FIG. 1B, a perspective view of a housing 120 complementary to the filter element 102 of FIG. 1A is shown, according to an example embodiment. The housing 120 includes a complementary alignment portion 122 formed in the housing 120, an inlet tube 124, an outlet tube 126, a first housing end 128, and a second housing end 129. The alignment portion 122 is a surface complementary to the alignment portion 104 of the filter element 102. As shown in FIG. 1B, the alignment portion 122 in the form of a contoured surface protrudes complementary to the depressed surface of the alignment portion 104 of the filter element 102. The single alignment portion 122 acts as a keying feature so that the filter element 102 can only be installed in one orientation. In some embodiments, the alignment portion 122 may be in the form of a depressed surface and varies in height due to the contoured surfaces. The alignment portion 122 may be a hemispherical, cylindrical, sideways cylindrical, or other generally similar shapes.

As shown in FIG. 1B, the housing 120 includes an integrated 90° inlet tube 124. The housing 120 also includes an integrated 90° outlet tube 126 that is fluidly connected to the first housing end (e.g., bottom end) 128. The outlet tube 126 protrudes into the cylindrical housing 120 inner volume and the contour of the alignment portion 122 formed in the first housing end 128 matches the profile of the outlet tube 126. Although the housing 120 is shown arranged as a cylindrical housing having a circular cross-sectional shape, the housing 120 can be arranged in other shapes to receive the filter element 102. The second housing end (e.g., top end) 129 is structured to receive a cover (not shown) to and enclose the filter element 102 within the housing 120. In some arrangements, the cover sealingly engages the second end cap 110 of the filter element 102 and/or sealingly engages with the housing 120.

Figure 1C:
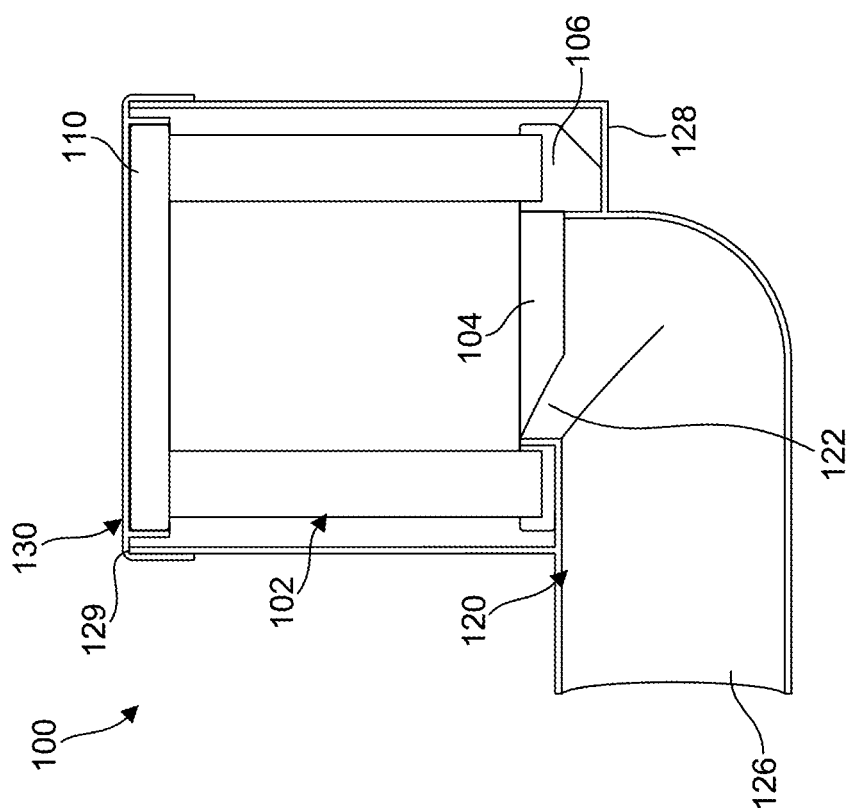
FIG. 1C shows a cross-sectional, side view of a filtration system including the filter element of FIG. 1A and the housing of FIG. 1B.

Referring to FIG. 1C, a cross-sectional, side view of a filtration system including the filter element of FIG. 1A and the housing of FIG. 1B is shown, according to an example embodiment. When the filtration system 100 is in the assembled state, the filter element 102 is positioned within a central compartment of the housing 120. The housing cover 130 encloses the filter element 102 within the housing 120. In some arrangements, the housing cover 130 may sealingly engaged with the second end cap 110 of the filter element 102 and the second housing end 129 of the housing 120. In some arrangements, a sealing member contacts the second housing end 129 of the housing such that when the top housing cover 130 is secured to the housing 120, the seal member is compressed between the housing 120 and the top housing cover 130.

As shown in FIG. 1C, the alignment portion 104 of the filter element 102 and the alignment portion 122 of the housing 120 are structured such that an unauthorized filter with a substantially lateral planar bottom surface (or uncomplimentary alignment portion) cannot sit flush with the alignment portion 122 disposed on the bottom surface of the housing 120. As shown in FIG. 1C, the filter element 102 and the complementary housing 120 align to provide sufficient travel for engagement of a radial seal between the filter element 102 and the housing 120. Specifically, the alignment portion 104 of the filter element 102 and the alignment portion 122 of the housing 120 align to seal via the disposition of the filter element 102 in the first housing end 128 of the housing 120. As will be appreciated, the engagement of the specific alignment portions 104, 122 makes it difficult, if not impossible, to radially or axially seal without using a filter that matches the housing. While the alignment portion 104 of the filter element 102 and the alignment portion 122 of the housing 120 are shown to align and engage, in some arrangements, the alignment portion 104 of the filter element 102 and the alignment portion 122 of the housing 120 only need to align, and not engage (e.g., a gap may exist), to provide for the engagement of the radial seal between the filter element 102 and the housing 120.

Generally, when the filtration system 100 is assembled, the filtration system 100 filters air and provides the filtered air to a device, such as an internal combustion engine. The filtration system 100 receives air to be filtered through the inlet tube 124. The air passes from the inlet tube 124, into the housing 120, and through the filter media 108 of the filter element 102. As the air passes through the filter media 108, the filter media 108 removes contaminants (e.g., dirt, dust, moisture, etc.) contained in the air. The alignment of the first end cap 106 and the alignment portion 122 of the housing 120 provide sufficient travel for engagement of a radial seal between the filter element 102 and the housing 120. In some arrangements, the engagement of the radial seal occurs between the inner diameter of the filter element 102 and the housing 120. In other arrangements, the engagement of the radial seal occurs between the outer diameter of the filter element 102 and the housing 120. The radial seal ensures that the filtered air that passes through the center of the filter element 102 travels out of the outlet tube 126. As the filter element 102 filters the air, the filter media 108 captures the contaminants. Accordingly, the filter element 102 requires periodic replacement as the filter media 108 reaches capacity.

Figure 2:
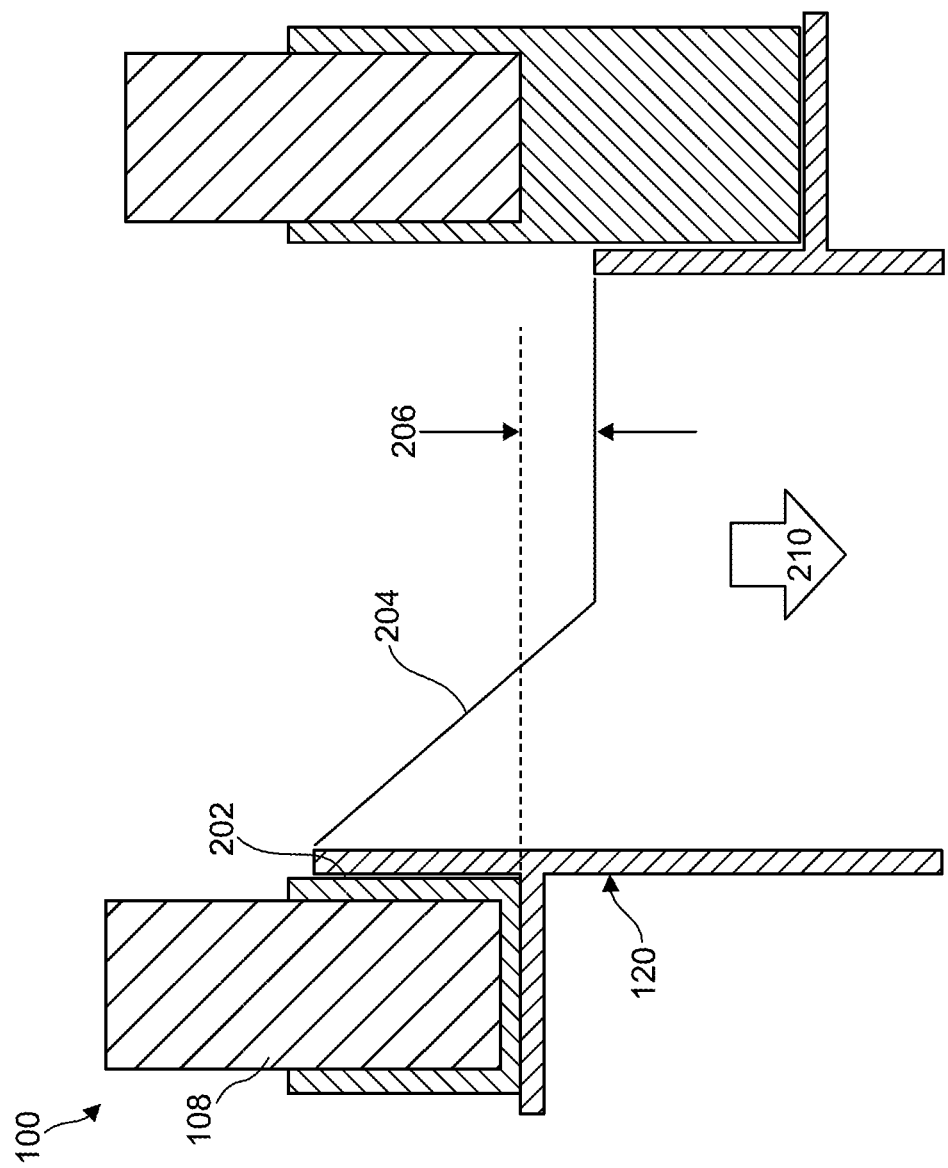
FIG. 2 shows a cross-sectional, perspective view of the radial sealing surface of the filtration system of FIG. 1C.

Referring to FIG. 2, a cross-sectional, perspective view of the radial sealing surface of the filtration system 100 of FIG. 1C is shown. As shown in FIG. 2, the engagement of the filter element 102 and the complementary housing 120 forms a radial seal 202. The filter element 102 that engages the housing 120 to form the radial seal 202 comprises a flexible material, such as urethane, and is configured to be compressed against the housing 120 to form the radial sealing surface 202 against. The alignment portion 122 of the housing 120 and the alignment portion 104 of the filter element 102 align to form the angled inner sealing wall 204. As used herein, the term "angled" refers to a surface that is angled with respect to a lateral plane that is substantially normal to a central axis of the filter element 102. The alignment portion 104 of the filter element 102 follows the contour of the alignment portion 122 of the housing 120 to form the angled inner sealing wall 204. Accordingly, the angled inner sealing wall 204 is such that one side of angled inner sealing wall 204 is higher than on the other side of the angled inner sealing wall 204. The height gap 206 caused by the difference in the heights of the sides of the angled inner seal prevents the axial sealing of the filter element 102 and the complementary housing 120. When properly sealed, as shown in FIG. 2, the air will flow 210 through the filter element 102 and out of the outlet tube 126 of the housing. In some embodiments, the engagement of the alignment portions provides for an axial seal between the filter element 102 and the first housing end 128.

Figure 3B:
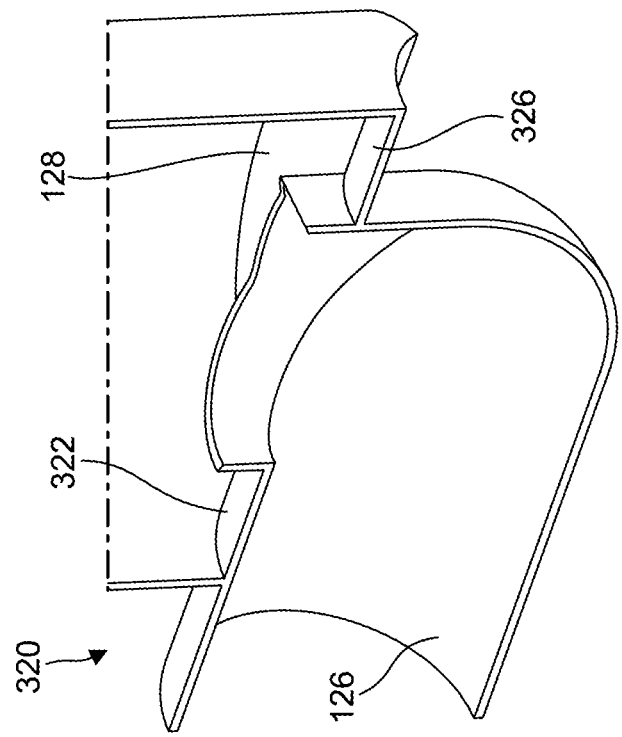
FIG. 3B shows a cross-sectional, perspective view of a housing complementary to the filter element of FIG. 3A.
Figure 3A:
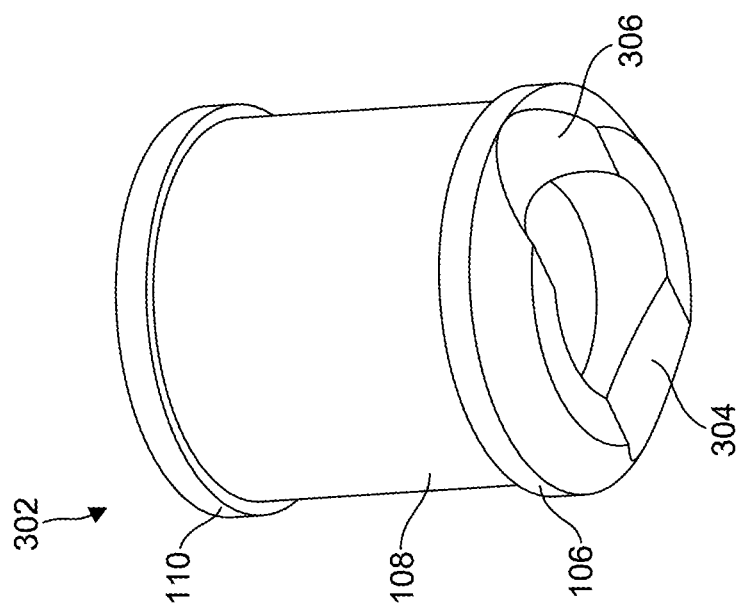
FIG. 3A shows a perspective view of a filter element according to a further example embodiment.

Referring to FIG. 3A, a perspective view of a filter element 302 is shown, according to another example embodiment. The filter element 302 is similar to the filter element 102. A difference between the filter element 302 and the filter element 102 is the arrangement of alignment portions of the filter element 302. Accordingly, like numbering is used to designate like parts between the filter element 302 and the filter element 102. The first end cap 106 includes a substantially lateral planar surface that is substantially normal to the central axis of the filter element 102 and two alignment portions (e.g., alignment surface, protrusion, etc.) 304, 306 in the form of contoured surfaces that are substantially curved with respect to the central axis of the outlet tube 126. As shown in FIG. 3A, the arrangement of the alignment portion of the filter element 302 is a first alignment portion 304 and a second alignment portion 306 disposed opposite of each other on the first end cap 106. In other words, the filter element 302 includes a matching contouring surface at locations on opposite sides of the first end cap 106 of the filter element 302. As will be appreciated, the first end cap 106 and alignment portions 304, 306 align with a housing having complementary alignment portions to provide sufficient travel for engagement of a radial seal between the filter element 302 and the housing 320. As shown in FIG. 3A, the alignment portions 304, 306 are depressed curved surfaces. In some embodiments, the alignment portions 304, 306 may be in the form of protruding curved surfaces.

The filter element 302 further includes a second end cap 110 and filter media 108. Although the filter media is shown arranged as a cylindrical filter block having a circular cross-sectional shape, the filter media 108 can be arranged in other shapes. The filter element 302 is substantially rigid such that the shape of the filter element 302 is maintained. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying with a stiffening agent, such as BASF® Elastocast 55090, polyurethane, or the like, etc.).

Referring to FIG. 3B, a perspective view of a housing 320 complementary to the filter element 302 of FIG. 3A is shown. The housing 320 is similar to the housing 120. A difference between the housing 320 and the housing 120 is the arrangement of alignment portions of the housing 320. Accordingly, like numbering is used to designate like parts between the housing 320 and the housing 120. As shown in FIG. 3B, the housing 320 includes a first alignment portion 322 formed in the housing 320, a second alignment portion 326 formed in the housing 320, an outlet tube 126, and a first housing end 128. The first alignment portion 322 is a surface complementary to the first alignment portion 304 of the filter element 302. The second alignment portion 326 is a surface complementary to the second alignment portion 326 of the filter element 302. The first alignment portion 322 and the second alignment portion 326 are in the form of a contoured surface that protrudes complementary to the depressed surfaces of the first alignment portion 304 and the second alignment portion 306 of the filter element 302. As will be appreciated, the first alignment portions 304, 322 are interchangeable with the second alignment portions 306, 326 such that the filter element 302 can only be installed in two orientations.

In some embodiments, one or both of the first alignment portion 322 and the second alignment portion 326 may be in the form of a depressed surface and varies in height due to the contoured surfaces. As shown in FIG. 3B, the housing 320 includes an integrated 90° outlet tube 126. The outlet tube 126 protrudes into the cylindrical housing 320 inner volume and the first housing end 128 profile matches the profile of the outlet tube 126 and first alignment portion 322 and the second alignment portion 326 contour. Although the housing 320 is shown arranged as a cylindrical housing having a circular cross-sectional shape, the housing 320 can be arranged in other shapes to receive the filter element 302. The housing includes a second housing end (not shown) structured to receive a cover (not shown) to enclose the filter element 302 within the housing 320. In some arrangements, the cover may sealingly engage the second end cap of the filter element 302.

Figure 3D:
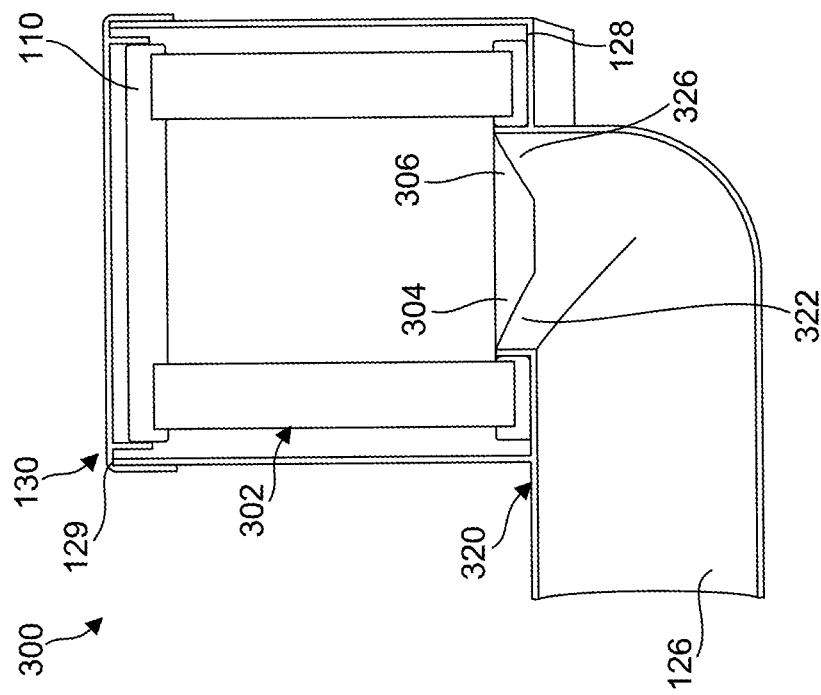
FIG. 3D shows a cross-sectional, side view of a filtration system including the filter element of FIG. 3A and the housing of FIG. 3B.
Figure 3C:
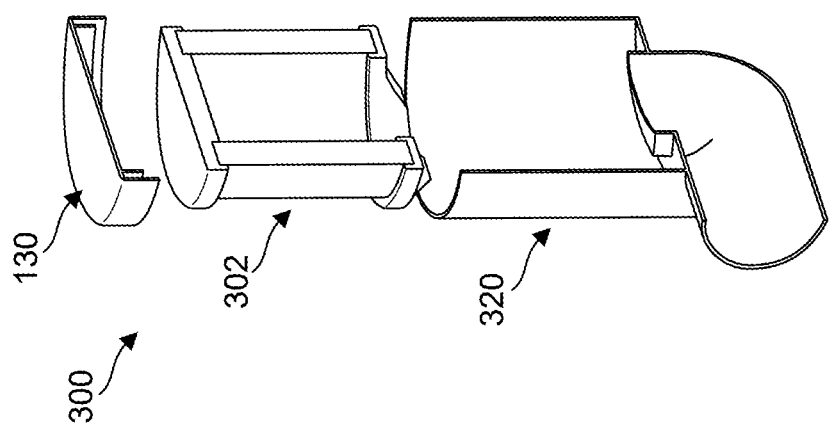
FIG. 3C shows a cross-sectional, exploded view of a filtration system including the filter element of FIG. 3A and the housing of FIG. 3B.

Referring to FIG. 3C, a cross-sectional, an exploded view of a filtration system 300 is shown according to an example embodiment. The filtration system 300 includes the filter element 302 of FIG. 3A, the housing 320 of FIG. 3B, and a housing cover 130. In some arrangements, the housing cover 130 is structured to sealingly engage the second end cap 110 of the filter element 302.

Referring to FIG. 3D, a cross-sectional, side view of the filtration system 300 assembled is shown. When the filtration system 300 is in the assembled state, the filter element 302 is positioned within a central compartment of the housing 320. The housing cover 130 encloses the filter element 302 within the housing 320. In some arrangements, the housing cover 130 may sealingly engage the second end cap 110 of the filter element 302 and the second housing end 129 of the housing 120. As shown in FIG. 3D, the housing cover 130 is a closed end cap, however, in other embodiments, the housing cover 130 is an open end cap. In some arrangements, a sealing member contacts the second housing end 129 of the housing such that when the top housing cover 130 is secured to the housing 320, the seal member is compressed between the housing 320 and the top housing cover 130 to form a seal. In another arrangement, the housing cover 130 comprises a cylindrical wall that protrudes into the center of the filter element 302 to form a radial seal on the inner diameter of the second end cap 110 of the filter element 302. In some arrangements, the radial seal is formed around the location of the engagement of the center of the vertical axis of the filter housing wall 320 and the filter element 302.

As shown in FIG. 3D, the first alignment portion 322 and the second alignment portion 326 of the housing 320 are in the form of a contoured surface that protrude complementary to the depressed surfaces of the first alignment portion 304 and the second alignment portion 306 of the filter element 302. As shown in FIG. 3D, the filter element 302 and the first housing end 128 of the complementary housing 320 align to provide sufficient travel for engagement of a radial seal between the filter element 302 and the housing 320. Specifically, the first alignment portion 322 and the second alignment portion 326 of the housing 320 and complementary depressed surfaces of the first alignment portion 304 and the second alignment portion 306 of the filter element 302 align to provide sufficient travel for engagement of a radial seal between the filter element 302 and the housing 320 via the disposition of the filter element 302 in first housing end 128. As will be appreciated, the alignment of the specific alignment portions 304, 306 and 322, 326 makes it difficult, if not impossible, to radially—or axially—seal without using a filter that matches the housing 320. While the alignment portion 304 of the filter element 302 and the alignment portion 322 of the housing 320 are shown to align and engage, in some arrangements, the alignment portion 304 of the filter element 302 and the alignment portion 322 of the housing 320 only need to align, and not engage (e.g., a gap may exist), to provide for the engagement of the radial seal between the filter element 302 and the housing 320.

Referring to FIG. 4A, a perspective view of a filter element 402 is shown, according to another example embodiment. The filter element 402 is similar to the filter element 102. A difference between the filter element 402 and the filter element 102 is the arrangement of alignment portions of the filter element 402. Accordingly, like numbering is used to designate like parts between the filter element 402 and the filter element 102. As shown in FIG. 4A, the arrangement of the alignment portion 404 of the filter element 402 comprises a plurality of (e.g., four) helical inlets formed on the first end cap 106. The helical inlets alignment portion 404 of the filter element 402 has a varying height relative to the substantially lateral planar surfaces that are substantially normal to the central axis of the filter element 402. In other words, the alignment portion 404 has alternating protrusions that increase to a peak and decrease into the flat, substantially lateral planar portions of the first end cap 106 of the filter element 402. Each of the helical inlets alignment portion 404 has a matching contouring surface at locations on opposite sides of the first end cap 106 of the filter element 402. As will be appreciated, the first end cap 106 and alignment portion 404 align with a housing having complementary alignment portions to provide sufficient travel for engagement of a radial seal between the filter element 402 and the housing.

The filter element 402 further includes a second end cap 110 and filter media 108. Although the filter media is shown arranged as a cylindrical filter block having a circular cross-sectional shape, the filter media 108 can be arranged in other shapes. The filter element 402 is substantially rigid such that the shape of the filter element 402 is maintained. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying with a stiffening agent, such as BASF® Elastocast 55090, polyurethane, or the like, etc.).

Referring to FIG. 4B, a perspective view of a housing 420 complementary to the filter element 402 of FIG. 4A is shown. The housing 420 is similar to the housing 120. A difference between the housing 420 and the similar housing 120 is the arrangement of a plurality (e.g., four) helical inlets as the alignment portion 424 of the housing 420. Accordingly, like numbering is used to designate like parts between the housing 420 and the housing 120. As shown in FIG. 4B, the housing 420 includes an alignment portion 424, the inlet tube 124, the outlet tube 126, a first housing end 128, and a second housing end 129. The helical inlets alignment portion 424 of the housing 420 is a surface complementary to the helical inlets alignment portion 404 of the filter element 402. As will be appreciated, the helical inlets alignment portion 424 of the housing is interchangeable with the four helical inlets alignment portion 404 of the filter element 402 such that the filter element 402 can only be installed in four orientations.

The outlet tube 126 protrudes into the cylindrical housing 420 inner volume and the first housing end 128 profile matches the profile of the outlet tube 126 and helical inlets alignment portion 424 contour. Although the housing 420 is shown arranged as a cylindrical housing having a circular cross-sectional shape, the housing 420 can be arranged in other shapes to receive the filter element 402. Additionally, the matching surface (e.g., ramp) feature of the helical inlets alignment portion 424 can improve tangential pre-cleaning.

Referring to FIG. 4C, a cross-sectional, side view of a filtration system 400 is shown. The filtration system 400 includes the filter element 402 of FIG. 4A, the housing 420 of FIG. 4B, and a housing cover 130. When the filtration system 400 is in the assembled state, the filter element 402 is positioned within a central compartment of the housing 420. In some arrangements, the housing cover 130 is sealingly engaged with the second end cap 110 of the filter element 402 and the second housing end 129 of the housing 420. As shown in FIG. 4C, the housing cover 130 is a closed end cap, however, in other embodiments, the housing cover 130 is an open end cap. In some arrangements, a sealing member contacts the second housing end 129 of the housing such that when the top housing cover 130 is secured to the housing 420, the seal member is compressed between the housing 420 and the top housing cover 130 to form a seal.

As shown in FIG. 4C, the helical inlets alignment portion 424 of the housing 420 are in the form of a plurality of contoured surface that protrude and depress complementary to the raised and depressed surfaces of four helical inlets alignment portion 404 of the filter element 402. As shown in FIG. 4C, the helical inlets alignment portion 404 of the filter element 402 and the complementary helical inlets alignment portion 424 of the housing 420 align to provide sufficient travel for engagement of a radial seal between the filter element 402 and the housing 420. As will be appreciated, the alignment of the alignment portions 404 and 424 makes it difficult, if not impossible, to radially or axially seal without using a filter that matches the housing. While the alignment portion 404 of the filter element 402 and the alignment portion 422 of the housing 420 are shown to align and engage, in some arrangements, the alignment portion 404 of the filter element 402 and the alignment portion 422 of the housing 420 only need to align, and not engage (e.g., a gap may exist), to provide for the engagement of the radial seal between the filter element 402 and the housing 420. In some arrangements, the radial seal is formed at the location of the engagement of the center of the vertical axis of the filter housing 420 wall and the filter element 402.

Figure 5B:
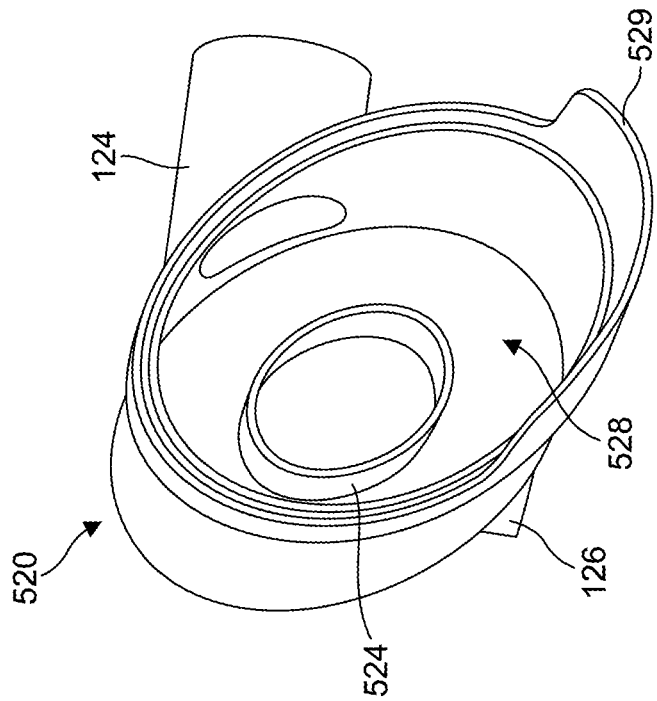
FIG. 5B shows a perspective view of a housing complementary to the filter element of FIG. 5A.
Figure 5A:
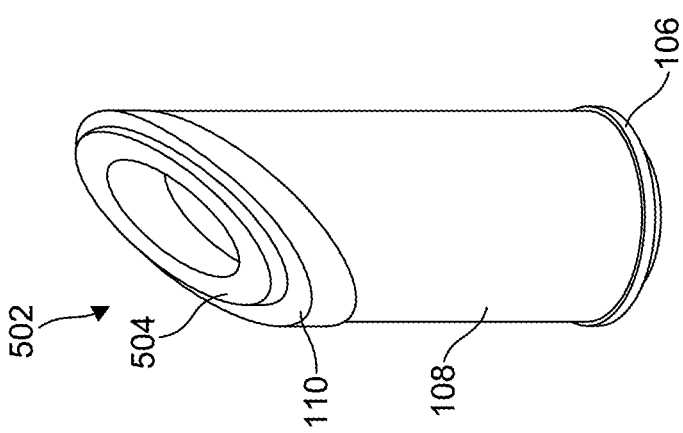
FIG. 5A shows a perspective view of a filter element according to still another example embodiment.

Referring to FIG. 5A, a perspective view of a filter element 502 is shown, according to another example embodiment. The filter element 502 is similar to the filter element 102. A difference between the filter element 502 and the filter element 102 is the arrangement of an alignment portion and the disposition on the filter element 502. Accordingly, like numbering is used to designate like parts between the filter element 502 and the filter element 102. As shown in FIG. 5A, the arrangement of the alignment portion 504 on the second end cap 110 of the filter element 502 is a substantially angled surface that is not normal to the central axis of the filter element 502. In other words, the filter element 502 has a varying, angled height which increases along the horizontal plane of the second end cap 110 of the filter element 502. As will be appreciated, the angled surface of the alignment portion 504 aides a 90° outlet tube on a complementary housing. In some embodiments, the alignment portion 504 is disposed on the first end cap 106 of the filter element 502. As will be appreciated, the second end cap 110 and alignment portion 504 align with a housing having a complementary alignment portion align to provide sufficient travel for engagement of a radial seal between the filter element 502 and the housing 520. The alignment portion 504 comprises an elliptical protrusion. In some arrangements, the radial seal is formed at the location of the engagement of the center of the vertical axis of the filter housing 520 wall and the filter element 502.

The filter element 502 further includes a first end cap 106 and filter media 108. Although the filter media is shown arranged as a cylindrical filter block having a circular cross-sectional shape, the filter media 108 can be arranged in other shapes. The urethane on the filter endcap is also angled such that more filter media 108 is exposed more on the long side of the filter element 502 than on the short side, resulting in more usable filter media 108 area. Accordingly, this variation results in lower restriction and higher dust capacity of the filter element 502. The filter element 502 is substantially rigid such that the shape of the filter element 502 is maintained. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying with a stiffening agent, such as BASF® Elastocast 55090, polyurethane, or the like, etc.).

Referring to FIG. 5B, a perspective view of a housing 520 complementary to the filter element 502 of FIG. 5A is shown. The housing 520 is similar to the housing 120. A difference between the housing 520 and the similar housing 120 is the arrangement of an angled surface on the alignment portion 524 of the housing 520. Accordingly, like numbering is used to designate like parts between the housing 520 and the housing 120. As shown in FIG. 5B, the housing 520 includes an alignment portion 524, the inlet tube 124, the outlet tube 126, a first housing end 528, and a second housing end 529. The angled alignment portion 524 of the housing 520 is a surface complementary to the angled alignment portion 504 of the filter element 502. As will be appreciated, the angled alignment portion 524 comprises an elliptical groove and acts as a keying feature so that the filter element 502 can only be installed in one orientation. In some embodiments, the alignment portion 524 may be in the form of a depressed surface and varies in height due to the contoured surfaces.

The outlet tube 126 protrudes into the cylindrical housing 520 inner volume and the first housing end 528 profile matches the profile of the outlet tube 126 and the angled alignment portion 524 contour. The angled alignment portion 524 formed on the first housing end 528 of the housing 520 has a constant height from the angled surface such that bottom of the housing 520 is also angled with respect to an axial surface substantially normal to the central axis. Additionally, the surfaces that align—to provide sufficient travel for engagement of a radial seal between the filter element 502 and the housing 520—are extruded in a direction that is substantially parallel to the central axis of the housing 520. Although the housing 520 is shown arranged as a cylindrical housing having a circular cross-sectional shape, the housing 520 can be arranged in other shapes to receive the filter element 502.

Figure 5D:
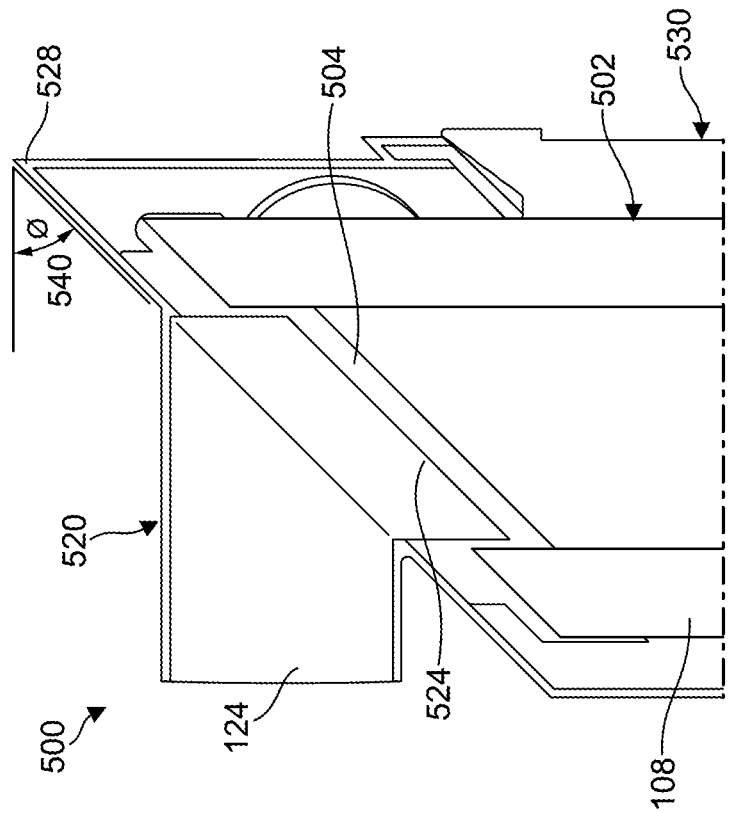
FIG. 5D shows a cross-sectional, perspective view of a portion of the filtration system of FIG. 5C.
Figure 5C:
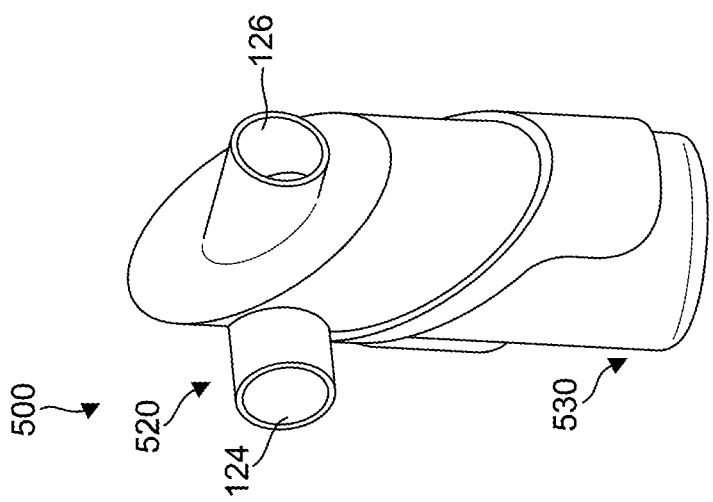
FIG. 5C shows a perspective view of a filtration system including the filter element of FIG. 5A and the housing of FIG. 5B.

Referring to FIG. 5C, a perspective view of an assembled filtration system 500 is shown, according to an example embodiment. The filtration system 500 includes the filter element 502 of FIG. 5A (not shown), the housing 520 of FIG. 5B, and a housing cover 530. When the filtration system 500 is in the assembled state, the filter element 502 is positioned within a central compartment of the housing 520. In some arrangements, the housing cover 530 is sealingly engaged with the first end cap 106 of the filter element 502 and the second housing end 529 of the housing 520. As shown in FIG. 5C, the housing cover 530 is a closed end cap, however, in other embodiments, the housing cover 530 is an open end cap. In some arrangements, a sealing member contacts the second housing end 129 of the housing 520 such that when the top housing cover 530 is secured to the housing 520, the seal member is compressed between the housing 520 and the top housing cover 530 to form a seal.

Referring to FIG. 5D, a cross-sectional, side view of a portion of the filtration system 500 of FIG. 5C is shown. The filtration system 500 includes the filter element 502 of FIG. 5A, the housing 520 of FIG. 5B, and a housing cover 530. When the filtration system 500 is in the assembled state, the filter element 502 is positioned within a central compartment of the housing 520. As shown in FIG. 5D, the filter element 502 and the complementary housing 520 align to provide sufficient travel for engagement of a radial seal between the filter element 502 and the housing 520. The top of the seal formed by the alignment of the angled alignment portion 524 of the housing 520 with the angled alignment portion 504 of the filter element 502 is not at a substantially constant depth with respect to the central axis. As will be appreciated, the alignment of the alignment portions 504 and 524 makes it difficult, if not impossible, to form a radial seal without using a filter that matches the housing. While the alignment portion 504 of the filter element 502 and the alignment portion 522 of the housing 520 are shown to align and engage, in some arrangements, the alignment portion 504 of the filter element 502 and the alignment portion 522 of the housing 520 only need to align, and not engage (e.g., a gap may exist), to provide for the engagement of the radial seal between the filter element 502 and the housing 520. The alignment portion 504 on the second end cap 110 forms a nonzero angle 540 with a longitudinal axis of the filtration system 500.

Figure 6B:
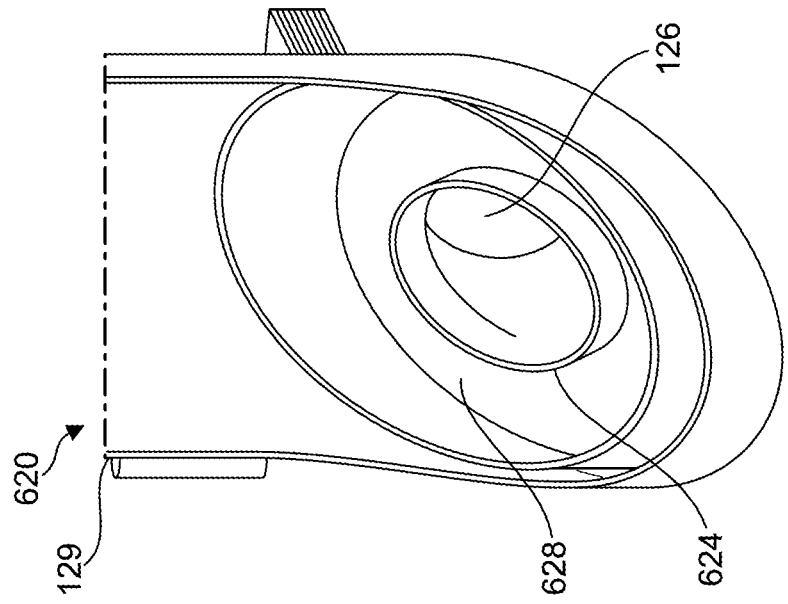
FIG. 6B shows a perspective view of a housing complementary to the filter element of FIG. 6A.
Figure 6A:
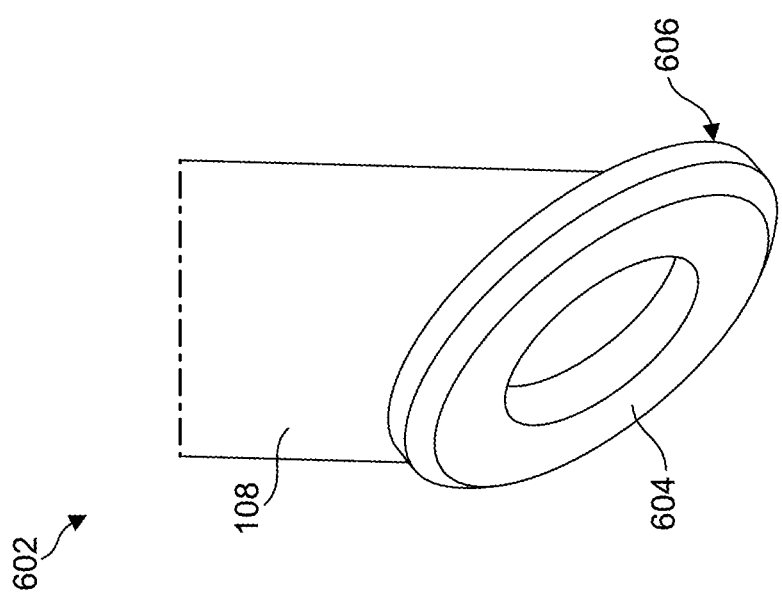
FIG. 6A shows a perspective view of a filter element according to still another example embodiment.

Referring to FIG. 6A, a perspective view of a filter element 602 is shown, according to another example embodiment. The filter element 602 is similar to the filter element 102. Differences between the filter element 602 and the filter element 102 are the arrangement of an alignment portion and the disposition on the filter element 602. Accordingly, like numbering is used to designate like parts between the filter element 602 and the filter element 102. As shown in FIG. 6A, the arrangement of the alignment portion 604 disposed on the first end cap 606 of the filter element 602 is an angled axial surface with respect to the central axis that is beneficial for installation of side load elements or filtration system. In other words, the filter element 602 has a varying, angled height which increases along the horizontal plane of the first end cap 606 of the filter element 602. As will be appreciated, the first end cap 606 and alignment portion 604 align with a housing having a complementary alignment portion to provide sufficient travel for engagement of a radial seal between the filter element 602 and the housing. The radial seal formed is not extruded in a direction substantially parallel to the central axis, instead, the radial seal is in a direction substantially normal to the angled alignment portion 604.

The filter element 602 further includes a second end cap 110 and filter media 108. Although the filter media is shown arranged as a cylindrical filter block having a circular cross-sectional shape, the filter media 108 can be arranged in other shapes. The urethane on the filter endcap is also angled such that more filter media 108 is exposed more on the long side of the filter element 602 than on the short side, resulting in more usable filter media 108 area. Accordingly, this variation results in lower restriction and higher dust capacity of the filter element 602. The filter element 602 is substantially rigid such that the shape of the filter element 602 is maintained. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying with a stiffening agent, such as BASF® Elastocast 55090, polyurethane, or the like, etc.).

Referring to FIG. 6B, a perspective view of a housing 620 complementary to the filter element 602 of FIG. 6A is shown. The housing 620 is similar to the housing 120. A difference between the housing 620 and the similar housing 120 is the arrangement of an angled surface on the alignment portion 624 of the housing 620 and the absence of the inlet tube 124. Accordingly, like numbering is used to designate like parts between the housing 620 and the housing 120. As shown in FIG. 6B, the housing 620 includes an angled alignment portion 624, an outlet tube 126, an angled first housing end 628, and a second housing end 129. The angled alignment portion 624 of the housing 620 is a surface complementary to the angled alignment portion 604 of the filter element 602. As will be appreciated, the angled alignment portion 624 acts as a keying feature so that the filter element 602 can only be installed in one orientation. In some embodiments, the alignment portion 624 may be in the form of a depressed surface and varies in height due to the contoured surfaces.

The outlet tube 126 protrudes into the cylindrical housing 620 inner volume and the angled first housing end 628 profile matches the profile of the outlet tube 126 and the angled alignment portion 624 contour. The angled alignment portion 624 of the housing 620 has a constant height from the angled surface such that bottom of the housing 620 is also angled with respect to an axial surface substantially normal to the central axis. Additionally, the surfaces that align to provide sufficient travel for engagement of a radial seal between the filter element 602 and the housing 620 are not extruded in a direction that is substantially parallel to the central axis of the housing 620. Instead, the alignment of the alignment portions 604, 624 is in a direction substantially normal to the angled surface of the alignment portion 624. Although the housing 620 is shown arranged as a cylindrical housing having a circular cross-sectional shape, the housing 620 can be arranged in other shapes to receive the filter element 602.

Referring to FIG. 6C, a perspective view of an assembled filtration system 600 is shown. The filtration system 600 includes the filter element 602 of FIG. 6A (not shown), the housing 620 of FIG. 6B, an inlet piece 640, and a housing cover 630. When the filtration system 600 is in the assembled state, the filter element 602 is positioned within a central compartment of the housing 620. The housing cover 630 provides additional locking and support of the filter element 602 and the housing 620. In some arrangements, the housing cover 630 is integrally formed on the side of the filter element 602. The inlet piece 640 is engaged with the second end cap 110 of the filter element 602, the second housing end 129 of the housing 620, and the housing cover 630. As shown in FIG. 6C, the inlet piece 640 is an open end with the inlet tube 124. However, in other embodiments, the inlet piece 640 is a closed end piece. In some arrangements, a sealing member contacts the second housing end 129 of the housing 620 such that when the top housing cover 630 is secured to the housing 620, the seal member is compressed between the housing 620 and the top housing cover 630 to form a seal.

Referring to FIG. 6D, a cross-sectional, side view of a portion of the filtration system 600 of FIG. 6C is shown. As shown in FIG. 6D, the filtration system 600 includes the filter element 602 of FIG. 6A, the housing 620 of FIG. 6B, and housing cover 630. When the filtration system 600 is in the assembled state, the filter element 602 is positioned within a central compartment of the housing 620. As shown in FIG. 6D, the filter element 602 and the complementary housing 620 align to provide sufficient travel for engagement of a radial seal between the filter element 602 and the housing 620. The top of the radial seal formed by the alignment of the angled alignment portion 624 of the housing 620 with the angled alignment portion 604 of the filter element 602 is not at a constant depth in a direction substantially normal to the angled surface. As will be appreciated, the engagement of the alignment portions 604 and 624 makes it difficult, if not impossible, to form a radial seal without using a filter that matches the housing. While the alignment portion 604 of the filter element 602 and the alignment portion 622 of the housing 620 are shown to align and engage, in some arrangements, the alignment portion 604 of the filter element 602 and the alignment portion 622 of the housing 620 only need to align, and not engage (e.g., a gap may exist), to provide for the engagement of the radial seal between the filter element 602 and the housing 620. In some arrangements, the radial seal is formed at the location of the engagement of the center of the vertical axis of the filter housing 620 wall and the filter element 602.

Figure 7B:
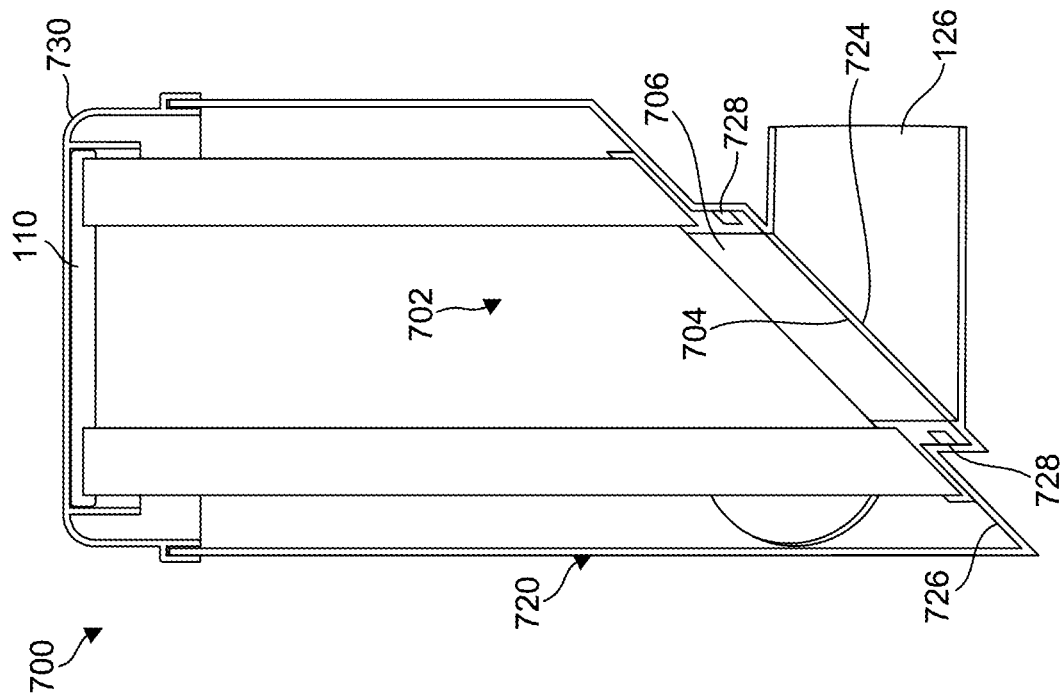
FIG. 7B shows a cross-sectional, perspective view of the filtration system of FIG. 7A.
Figure 7A:
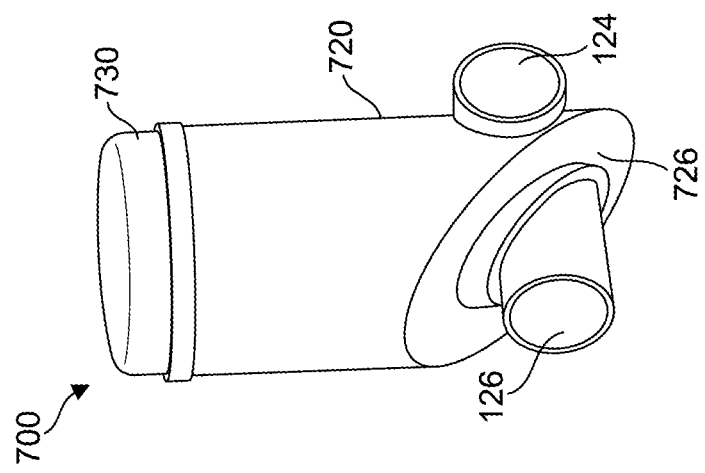
FIG. 7A shows a perspective view of a filtration system according to a further example embodiment.

Referring to FIG. 7A, a perspective view of an assembled filtration system 700 is shown, according to another example embodiment. The filtration system 700 is similar to the filtration system 100 of FIG. 1C. A difference between the filtration system 700 and the similar filtration system 100 is the arrangement of an angled surface on the alignment portions of the housing and filter element and the use of an angled endcap with a sealing member. Accordingly, like numbering is used to designate like parts between the filtration system 700 and the filtration system 100. As shown in FIG. 7A, the filtration system 700 includes a housing 720 and housing cover 730. The housing 720 includes an inlet tube 124, an outlet tube 126, a first housing end 726, and a second housing end 129. In some arrangements, the housing cover 730 is sealingly engaged with the second housing end 129. As shown in FIG. 7A, the housing cover 730 is a closed cover. However, in other embodiments, the housing cover 730 is an open cover. In some arrangements, a sealing member contacts the second housing end 129 such that when the top housing cover 730 is secured to the second housing end 129, the seal member is compressed between the second housing end 129 and the top housing cover 730 to form a seal.

Referring to FIG. 7B, a cross-sectional, side view of the filtration system 700 of FIG. 7A is shown. As shown in FIG. 7B, the filtration system 700 includes a filter element 702, the housing 720 of FIG. 7A, the housing cover 730, and an angled sealing member 728. When the filtration system 700 is in the assembled state, the filter element 702 is positioned within a central compartment of the housing 720. The filter element 702 includes filter media 108 disposed between an angled first end cap 706 and a second end cap 110. As shown in FIG. 7B, an angled alignment portion 704 disposed on the angled first end cap 706 of the filter element 702 aligns with an angled alignment portion 724 disposed on the first housing end 726. The angled first end cap 706 seals on the radial outer diameter of the angled first end cap 706 and seals on the radial inner diameter of the first housing end 726. The seal between the angled first end cap 706 and housing 720 may be aided by using the angled sealing member 728 in the form of a gasket or an O-ring. In some embodiments, the angled first end cap 706 may be media embedded or potted. As shown in FIG. 7B, the angled alignment portion 724 of the housing 720 and the angled alignment portion 704 of the angled outlet end cap 706 align to provide sufficient travel for engagement of a radial seal between the filter element 702 and the housing 720. As will be appreciated, the alignment of the alignment portions 704 and 724 makes it difficult, if not impossible, to radially or axially seal without using a filter that matches the housing. While the alignment portion 704 of the filter element 702 and the alignment portion 722 of the housing 720 are shown to align and engage, in some arrangements, the alignment portion 704 of the filter element 702 and the alignment portion 722 of the housing 720 only need to align, and not engage (e.g., a gap may exist), to provide for the engagement of the radial seal between the filter element 702 and the housing 720. In some arrangements, the radial seal is formed at the location of the engagement of the center of the vertical axis of the filter housing 720 wall and the filter element 702.

Referring to FIG. 8A, a cross-sectional, perspective view of a filtration system 800 including a keyed center tube interface is shown, according to a further example embodiment. The filtration system 800 is similar to the filtration system 100 of FIG. 1C. A difference between the filtration system 800 and the similar filtration system 100 is the use of a keyed center tube interface to align datum seal planes to the proper location. Accordingly, like numbering is used to designate like parts between the filtration system 800 and the filtration system 100. As shown in FIG. 8A, the filtration system 800 includes the filter element 802, the housing 120, a housing cover 130, and a keyed center tube 828 integral to the filter element 802.

The filter element 802 includes a first end cap 106 has a laterally planar surface that is substantially normal to the central axis of the filter element 802 and an alignment portion (e.g., alignment surface, protrusion, etc.) 104 in the form of a contoured surface that is substantially parallel to the central axis of the filter element 102. In other words, the contoured surface is extruded in a direction perpendicular to the central axis such that a portion of the surface is in a direction normal to the central axis and a portion of the surface (e.g., direction of indentation) is in a direction parallel to the central axis of the filter element 802. As shown in FIG. 8A, the alignment portion 104 is a depressed surface. Additionally, the filter element 802 has a keyed center tube 828 that is integral to the filter element 802. The housing 120 includes an alignment portion 122, an inlet tube 124, an outlet tube 126, a first housing end 128, and a second housing end 129. The alignment portion 122 is a surface complementary to the alignment portion 104 of the filter element 802. As will be appreciated, the first end cap 106 and alignment portion 104 align with the complementary alignment portion 122 of the housing 120 to provide sufficient travel for engagement of a radial seal between the filter element 802 and the housing 120.

The keyed center tube 828 is potted in urethane and is integral to the filter element 802. The keyed center tube 828 is structured with a keyed interface that aligns and seals into the proper location. The keyed center tube 828 is structured to align itself to the angled step change of the alignment portion 122 of the housing 120. The inner diameter to the keyed center tube 828 is less than the inner diameter of the urethane, protruding inward. This additional radial inward protrusion allows the keyed center tube 828 to interface with a radial sealing wall of the housing 120. When installing the element, the keyed center tube 828 first makes contact with the sealing wall before the filter element 802 makes contact with the surface of the first housing end 128. This aides in ensuring the filter element 802 is located in the correct orientation because the keyed center tube 828 can easily slide on the wall (e.g. plastic to plastic interface) allowing a user to rotate the filter element 802 until it reaches the correct position. Without this interface, the bottom of the filter element 802 would need to slide against the bottom surface of the first housing end 128 resulting in higher friction (urethane to plastic contact). In some embodiments, the keyed center tube 828 comprises a protruding rib and there is a corresponding slot for the protruding rib on the housing 120. In some arrangements, the keyed center tube 828 is integrated into an end cap 106, 110 of the filter element 802 for potting or embedding.

Figure 8B:
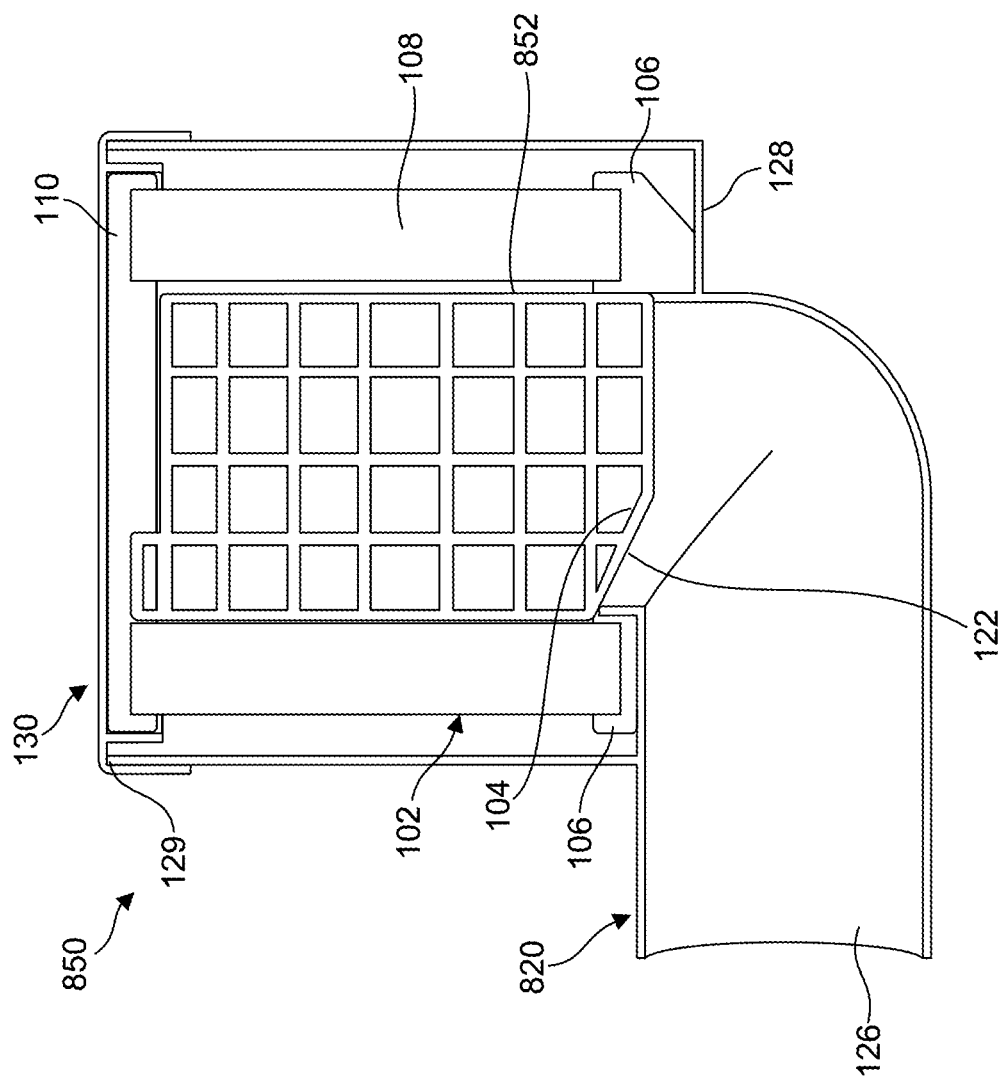
FIG. 8B shows a perspective view of a filtration system including a center tube interface according to a further example embodiment.

Referring to FIG. 8B, a cross-sectional, perspective view of a filtration system 850 including a including a center tube interface is shown, according to another further example embodiment. The filtration system 850 is similar to the filtration system 800 of FIG. 8A. A difference between the filtration system 850 and the similar filtration system 800 is the use of a center tube that is integral to the housing—via molding, welding, or snap fit—instead of the filter element. Accordingly, like numbering is used to designate like parts between the filtration system 850 and the filtration system 800. As shown in FIG. 8B, the filtration system 850 includes a filter element 102, a housing 820, a housing cover 130, and a center tube 852 integral to the housing 820.

The filter element 102 includes filter media 108 disposed between a first end cap 106 and a second end cap 110. The first end cap 106 has a substantially lateral planar surface that is substantially normal to the central axis of the filter element 102 and an alignment portion (e.g., alignment surface, protrusion, etc.) 104 in the form of a contoured surface that is substantially parallel to the central axis of the filter element 102. As shown in FIG. 8B, the alignment portion 104 is a depressed surface. The housing 820 includes an alignment portion 122, an inlet tube 124, an outlet tube 126, a first housing end 128, and the integral center tube 852. The alignment portion 122 is a surface complementary to the alignment portion 104 of the filter element 102. As will be appreciated, the first end cap 106 and alignment portion 104 aligns with the complementary alignment portion 122 of the housing 820 to provide sufficient travel for engagement of a radial seal between the filter element 102 and the housing 820.

The integral center tube 852 is molded integral to the housing 820 or engaged via a snap fit connection. The integral center tube 852 has a keyed interface in the axial direction that has a complementary surface in the filter element 102. The keyed interface of the integral center tube 852 engages the second end cap 110 of the filter element 102 and aligns to the proper location on the filter element 102 to sealingly engage. The inner diameter to the integral center tube 852 is less than the inner diameter of the urethane, protruding inward. If the filter element 102 is misaligned, the housing cover 130 will not properly seal due to the keyed interface of the integral center tube 852 being misaligned.

Figure 9B:
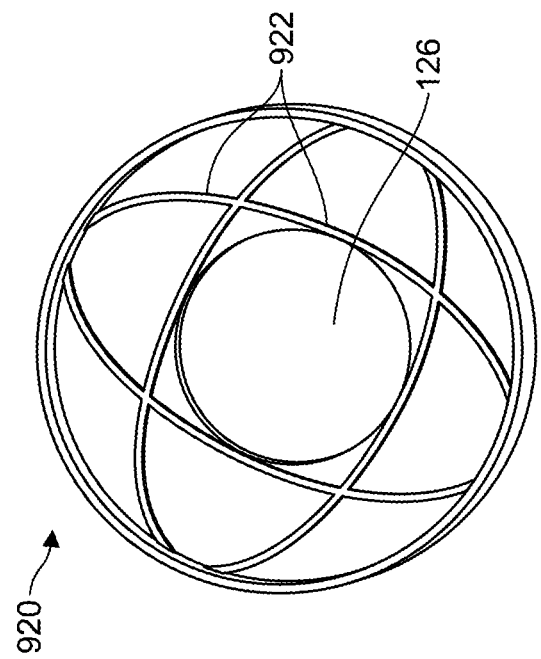
FIG. 9B shows a perspective view of a housing shown in FIG. 9A.
Figure 9A:
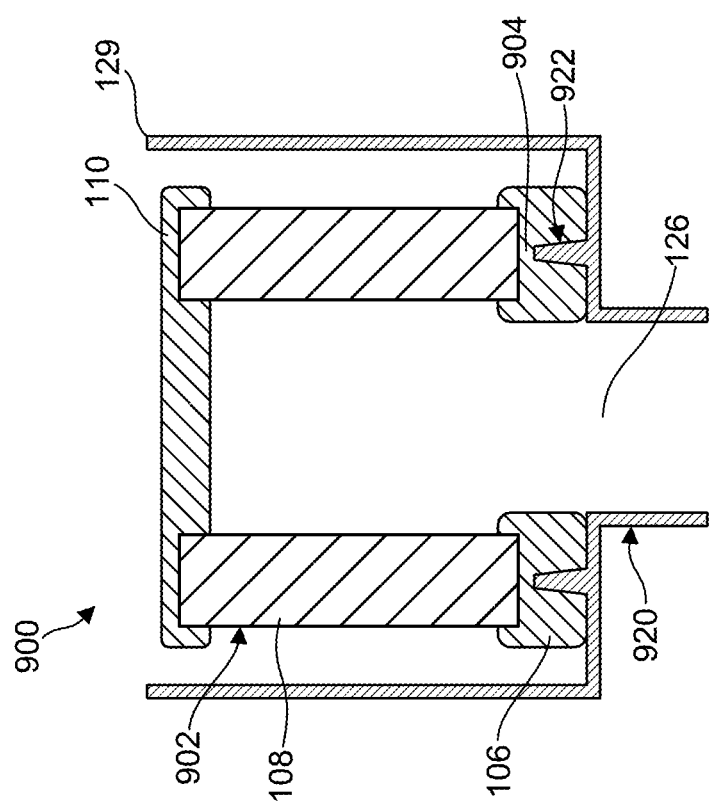
FIG. 9A shows a cross-sectional, side view of a filtration system including a central sealing rib according to an example embodiment.

Referring to FIG. 9A, a cross-sectional, side view of a filtration system 900 including a central sealing rib is shown, according to a further example embodiment. The filtration system 900 is similar to the filtration system 100 of FIG. 2. Differences between the filtration system 900 and the similar filtration system 100 include the absence of an angled alignment portion and the use of a central sealing rib. Accordingly, like numbering is used to designate like parts between the filtration system 900 and the filtration system 100. As shown in FIG. 9A, the filtration system 900 includes a filter element 902 and a housing 920. The filter element 902 includes a filter media 108, a second end cap 110, a first end cap 106, and an alignment portion 904 on the first end cap 106 in the form of a recess to receive a complementary feature of the housing 920.

As shown in FIG. 9A, the housing 920 includes an outlet tube 126 and a flexible rib 922. The flexible rib 922 is structured to align with the complementary surface of the alignment portion 904 of the filter element 902. The flexible rib 922 is not rigid enough to seal only one side of the filter element 902 and housing 920, thus the flexible rib 922 is disposed on multiple sides of the housing 920 to engage with the filter element 902 at multiple points. The radial seal occurs on the inner diameter and the outer diameter of the flexible rib 922. In some embodiments, the flexible rib 922 is integrally formed with the housing 920. One example embodiment of the housing 920 is shown in FIG. 9B. The housing 920 includes a circular, crisscross pattern of the flexible rib 922. The flexible rib 922 extends all the way out to the housing 920 wall and tube of the outlet tube 126 to require sealing on both sides and, beneficially, forms a seal between the filter element 902 and the housing 920.

Referring to FIG. 9C, a cross-sectional, side view of a filtration system 930 including a central sealing rib is shown, according to a further example embodiment. The filtration system 930 is similar to the filtration system 900 of FIG. 9A. A difference between the filtration system 930 and the similar filtration system 900 is the different configuration of the flexible rib and sealing engagement. Accordingly, like numbering is used to designate like parts between the filtration system 930 and the filtration system 900. As shown in FIG. 9C, the filtration system 930 includes a filter element 932 and a housing 940. The filter element 932 includes a filter media 108, a second end cap 110, a first end cap 106, and an alignment portion 934 on the first end cap 106 in the form of a recess to receive a complementary feature alignment portion 942 of the housing 940.

As shown in FIG. 9C, the housing 940 includes an outlet tube 126 and a central rib 942. The central rib 942 includes an inner diameter surface 944 and an outer diameter surface 946 that are structured to align with a complementary surface of the alignment portion 934 of the filter element 932. The central rib 942 is slanted such that the inner diameter surface 944 is a vertical wall and the outer diameter surface 946 is an angled surface. The central rib 942 is disposed on multiple side of the housing 940 and is structured to align with engage with the filter element 902 at multiple points. As will be appreciated, sealing only occurs on the angled surface of the outer diameter surface 946. The inner diameter surface 944 is only used for generating the retention force to retain the filter element 932 in the housing 940. In some arrangements, the central rib 942 needs only to align, and not engage (e.g., a gap may exist), with the filter element 902 to provide for the engagement of the radial seal.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:
1. A filtration system, comprising:
a housing having a first housing end and a second housing end and defining a central compartment therein, the housing comprising a first alignment portion disposed on the first housing end; and a filter element positioned within the central compartment of the housing, the filter element having a first filter end and a second filter end, the filter element comprising:
  filter media; and
  a second alignment portion disposed on the first filter end, the second alignment portion complementary to the first alignment portion, the second alignment portion comprising a first surface and a second surface, the second alignment portion having a variable cross-section such that a distance between the first surface and the second surface varies along at least a portion of the second alignment portion, the variable cross-section being complementary to the first alignment portion of the housing such that the second alignment portion aligns with the first alignment portion of the housing to provide for engagement of a radial seal between the filter element and the housing when the filter element is properly installed within the housing, the second alignment portion including a plurality of curved protrusions, the first filter end further including a substantially lateral planar portion that is substantially normal to a central axis of the filter element, at least one of the plurality of curved protrusions extending from the substantially lateral planar portion.

2. The filtration system of claim 1, wherein a height of the radial seal between the housing and the filter element varies along a circumferential direction relative to a central axis of the housing.

3. The filtration system of claim 1, wherein the housing comprises an angled inner sealing wall that is structured to sealingly engage with the filter element, a height of the angled inner sealing wall varies along a circumferential direction relative to a central axis of the housing.

4. The filtration system of claim 1, wherein a height of at least one of the plurality of curved protrusions varies relative to the substantially lateral planar portion.

5. The filtration system of claim 1, wherein a first curved protrusion of the plurality of curved protrusions is spaced apart from a second curved protrusion of the plurality of curved protrusions by the substantially lateral planar portion.

6. The filtration system of claim 1, wherein the housing comprises an end cap, the first alignment portion of the housing disposed on the end cap.

7. A filtration system, comprising:
a housing having a first housing end and a second housing end and defining a central compartment therein, the housing comprising a first alignment portion disposed on the first housing end; and
a filter element positioned within the central compartment of the housing, the filter element having a first filter end and a second filter end, the filter element comprising:
  filter media; and
  a second alignment portion disposed on the first filter end, the second alignment portion complementary to the first alignment portion, the second alignment portion comprising a first surface and a second surface, the second alignment portion having a variable cross-section such that a distance between the first surface and the second surface varies along at least a portion of the second alignment portion, the variable cross-section being complementary to the first alignment portion of the housing such that the second alignment portion aligns with the first alignment portion of the housing to provide for engagement of a radial seal between the filter element and the housing when the filter element is properly installed within the housing, the second alignment portion including a plurality of curved protrusions, the plurality of curved protrusions comprising a plurality of helical protrusions.

8. A filtration system, comprising:
a housing having a first housing end and a second housing end and defining a central compartment therein, the housing comprising a first alignment portion disposed on the first housing end; and
a filter element positioned within the central compartment of the housing, the filter element having a first filter end and a second filter end, the filter element comprising:
  filter media; and
  a second alignment portion disposed on the first filter end, the second alignment portion complementary to the first alignment portion, the second alignment portion comprising a first surface and a second surface, the second alignment portion having a variable cross-section such that a distance between the first surface and the second surface varies along at least a portion of the second alignment portion, the variable cross-section being complementary to the first alignment portion of the housing such that the second alignment portion aligns with the first alignment portion of the housing to provide for engagement of a radial seal between the filter element and the housing when the filter element is properly installed within the housing, the second alignment portion including a plurality of curved protrusions, the first filter end further comprising a substantially lateral planar portion, at least one curved protrusion of the plurality of curved protrusions comprising an angled portion that increases into a peak and decreases into the substantially lateral planar portion.

9. A filter element configured to be positioned within a central compartment of a housing, the filter element having a first filter end and a second filter end, the filter element comprising:
filter media; and
a first alignment portion disposed on the first filter end, the first alignment portion configured to engage a complementary second alignment portion on the housing, the first alignment portion comprising a first surface and a second surface, the first alignment portion having a variable cross-section such that a distance between the first surface and the second surface varies along at least a portion of the first alignment portion, the variable cross-section being complementary to the second alignment portion of the housing such that the first alignment portion aligns with the second alignment portion of the housing so as to provide for engagement of a radial seal between the filter element and the housing when the filter element is properly installed within the housing, the first alignment portion including a plurality of curved protrusions, the first filter end further including a substantially lateral planar portion that is substantially normal to a central axis of the filter element, at least one of the plurality of curved protrusions extending from the substantially lateral planar portion.

10. The filter element of claim 9, wherein a height of a radial sealing surface of the filter element varies along a circumferential direction relative to the central axis of the filter element.

11. The filter element of claim 9, wherein a height of at least one of the plurality of curved protrusions varies relative to the substantially lateral planar portion.

12. A filter element configured to be positioned within a central compartment of a housing, the filter element having a first filter end and a second filter end, the filter element comprising:
   filter media; and
   a first alignment portion disposed on the first filter end, the first alignment portion configured to engage a complementary second alignment portion on the housing, the first alignment portion comprising a first surface and a second surface, the first alignment portion having a variable cross-section such that a distance between the first surface and the second surface varies along at least a portion of the first alignment portion, the variable cross-section being complementary to the second alignment portion of the housing such that the first alignment portion aligns with the second alignment portion of the housing so as to provide for engagement of a radial seal between the filter element and the housing when the filter element is properly installed within the housing, the first alignment portion including a plurality of curved protrusions, wherein the plurality of curved protrusions comprise a plurality of helical protrusions.

13. The filter element of claim 12, wherein the plurality of helical protrusions comprises a first helical protrusion, a second helical protrusion, a third helical protrusion, and a fourth helical protrusion disposed around a central opening in the first filter end, the first helical protrusion disposed adjacent to the second helical protrusion and the fourth helical protrusion and disposed opposite of the third helical protrusion, the second helical protrusion disposed adjacent to the first helical protrusion and the third helical protrusion and disposed opposite of the fourth helical protrusion.

14. A filter element configured to be positioned within a central compartment of a housing, the filter element having a first filter end and a second filter end, the filter element comprising:
   filter media; and
   a first alignment portion disposed on the first filter end, the first alignment portion configured to engage a complementary second alignment portion on the housing, the first alignment portion comprising a first surface and a second surface, the first alignment portion having a variable cross-section such that a distance between the first surface and the second surface varies along at least a portion of the first alignment portion, the variable cross-section being complementary to the second alignment portion of the housing such that the first alignment portion aligns with the second alignment portion of the housing so as to provide for engagement of a radial seal between the filter element and the housing when the filter element is properly installed within the housing, the first alignment portion including a plurality of curved protrusions, the first filter end further comprising a substantially lateral planar portion, at least one curved protrusion of the plurality of curved protrusions comprising an angled portion that increases in to a peak and decreases in to the substantially lateral planar portion.

* * * * *